(12) United States Patent
Du et al.

(10) Patent No.: US 7,893,583 B2
(45) Date of Patent: Feb. 22, 2011

(54) POWER TOOLS WITH MOTOR HAVING A MULTI-PIECE STATOR

(75) Inventors: Hung T. Du, Reisterstown, MD (US); Earl M. Ortt, Bel Air, MD (US); Brandon L. Verbrugge, Towson, MD (US); Garrett P. McCormick, Manchester, MD (US); Michael A. Zemlock, North Haven, CT (US); Kevin M. Hogan, Jarrettsville, MD (US); Jiaqi Zhang, Baltimore, MD (US); Ren Hong Wang, Timonium, MD (US); Frank A. Mannarino, Baltimore, MD (US); Spencer G. Maid, Fallston, MD (US); Shane Ashley Moll, Mechanicsburg, PA (US); James C. Benton, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 476 days.

(21) Appl. No.: 11/885,712

(22) PCT Filed: Mar. 6, 2006

(86) PCT No.: PCT/US2006/008063

§ 371 (c)(1),
(2), (4) Date: Jun. 4, 2008

(87) PCT Pub. No.: WO2006/096708

PCT Pub. Date: Sep. 14, 2006

(65) Prior Publication Data

US 2009/0021090 A1    Jan. 22, 2009

Related U.S. Application Data

(60) Provisional application No. 60/660,114, filed on Mar. 9, 2005, provisional application No. 60/659,336, filed on Mar. 7, 2005.

(51) Int. Cl.
    *H02K 7/14* (2006.01)
(52) U.S. Cl. .......................................... 310/89; 310/50
(58) Field of Classification Search .................. 310/89, 310/47, 50, 216.028
    See application file for complete search history.

(56) References Cited

U.S. PATENT DOCUMENTS

| | | | | |
|---|---|---|---|---|
| 1,132,992 | A * | 3/1915 | Wood | 310/216.028 |
| 5,856,715 | A * | 1/1999 | Peot et al. | 310/50 |
| 6,034,461 | A | 3/2000 | Sun | |
| 6,198,195 | B1 * | 3/2001 | Embree et al. | 310/254.1 |
| 6,246,133 | B1 * | 6/2001 | Embree et al. | 310/47 |
| 6,683,396 | B2 | 1/2004 | Ishida et al. | |
| 7,026,740 | B2 * | 4/2006 | Park et al. | 310/216.028 |

FOREIGN PATENT DOCUMENTS

DE        38 42 560 A1    6/1990

* cited by examiner

*Primary Examiner*—Dang D Le
(74) *Attorney, Agent, or Firm*—Harness, Dickey & Pierce, P.L.C.

(57) ABSTRACT

A power tool has a motor having a stator made by separately forming pole pieces, return path pieces and field coils. The field coils are placed over necks of the pole path pieces and the return path pieces are affixed to the pole pieces. An armature having an outside diameter of at least 0.625 the outside diameter of the stator is placed in the stator. The field coils may be formed so that they extend beyond pole tips of the pole pieces.

8 Claims, 29 Drawing Sheets

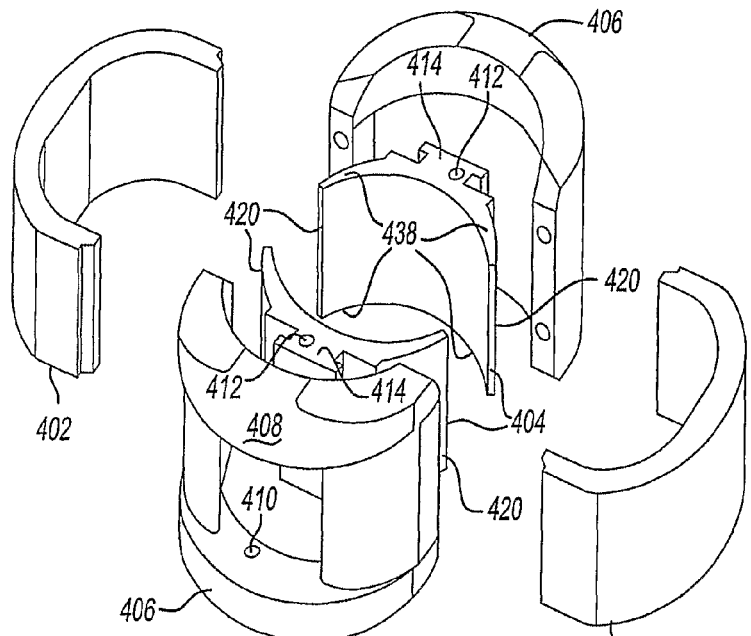
*Fig-4A*
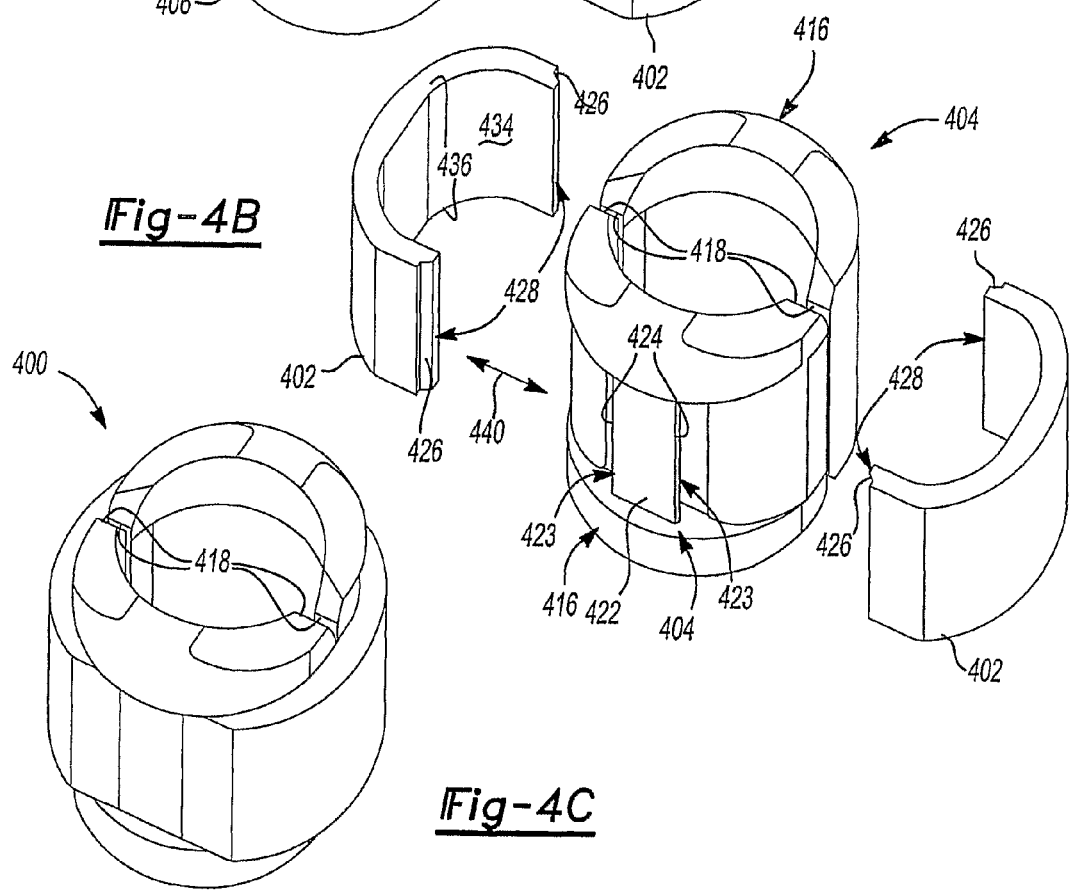
*Fig-4B*
*Fig-4C*

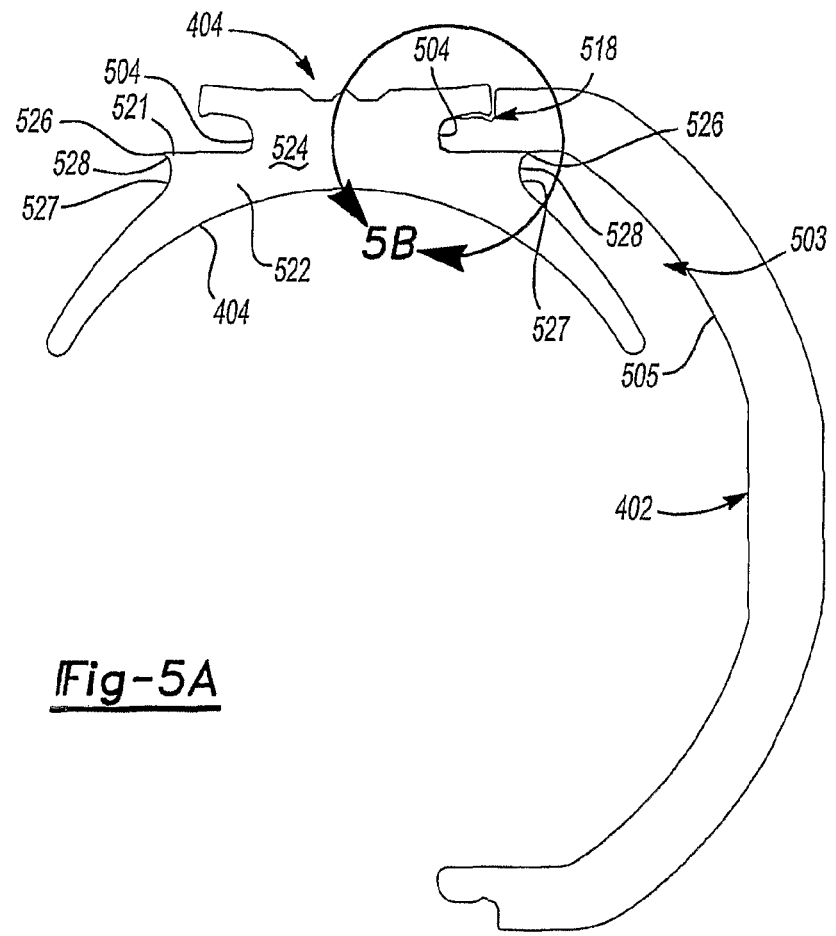
*Fig-5A*
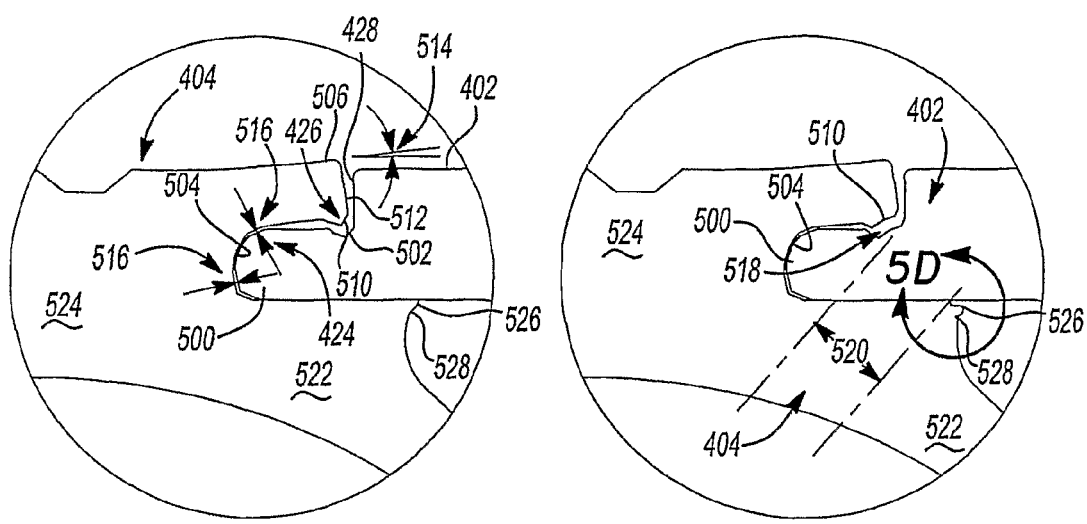
*Fig-5B*  *Fig-5C*

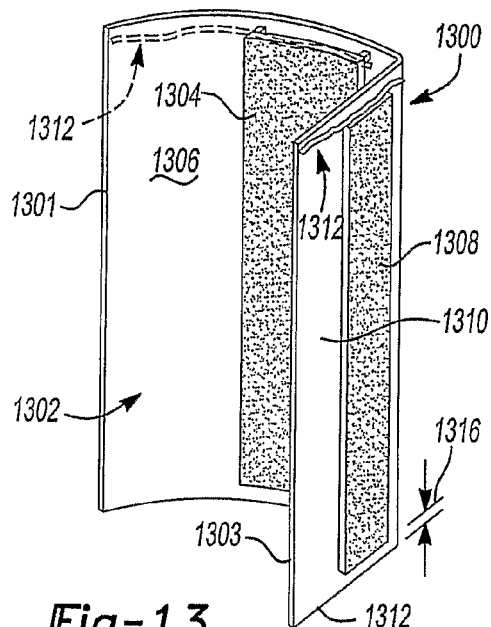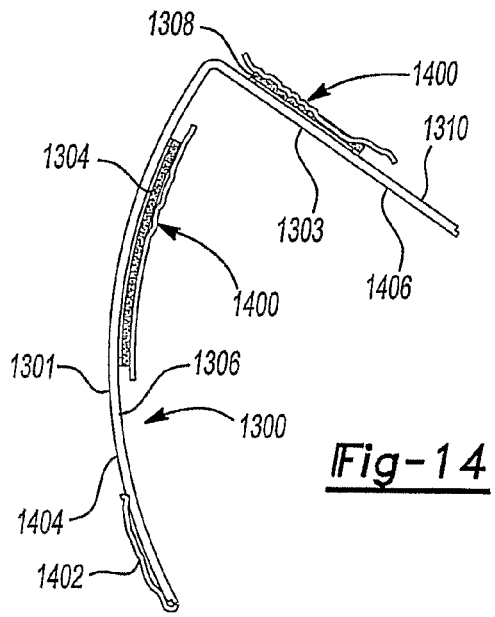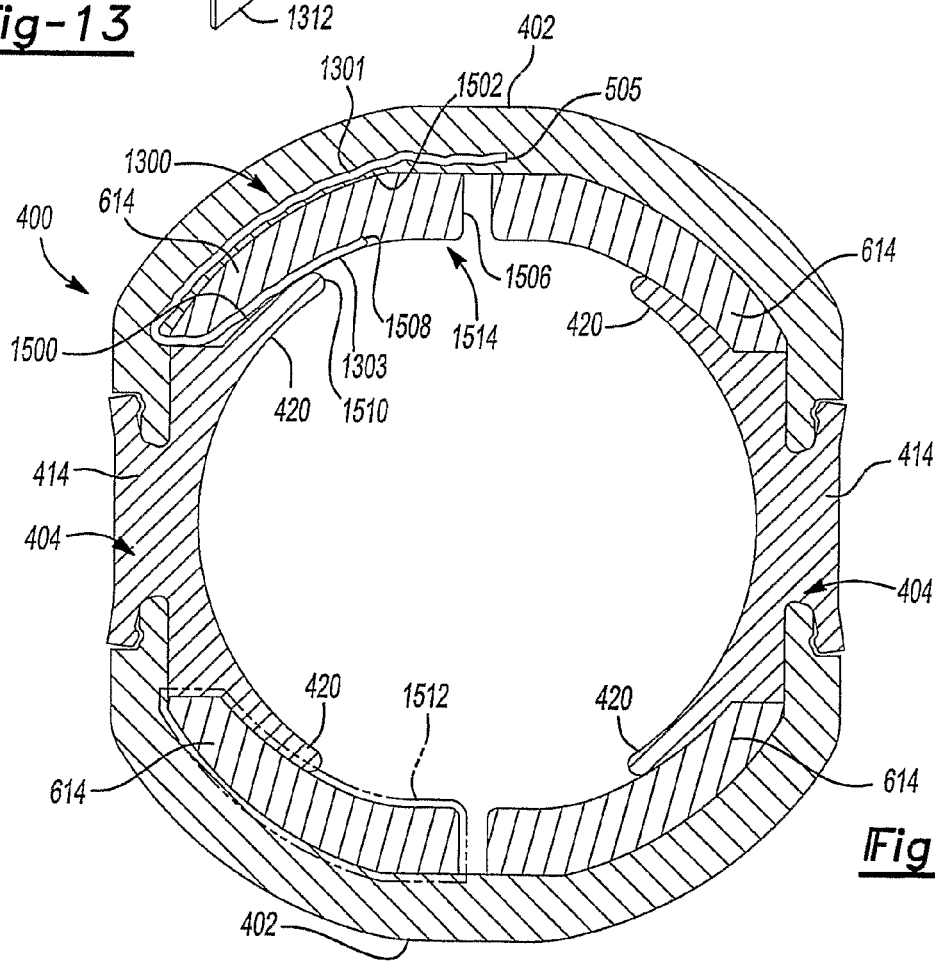

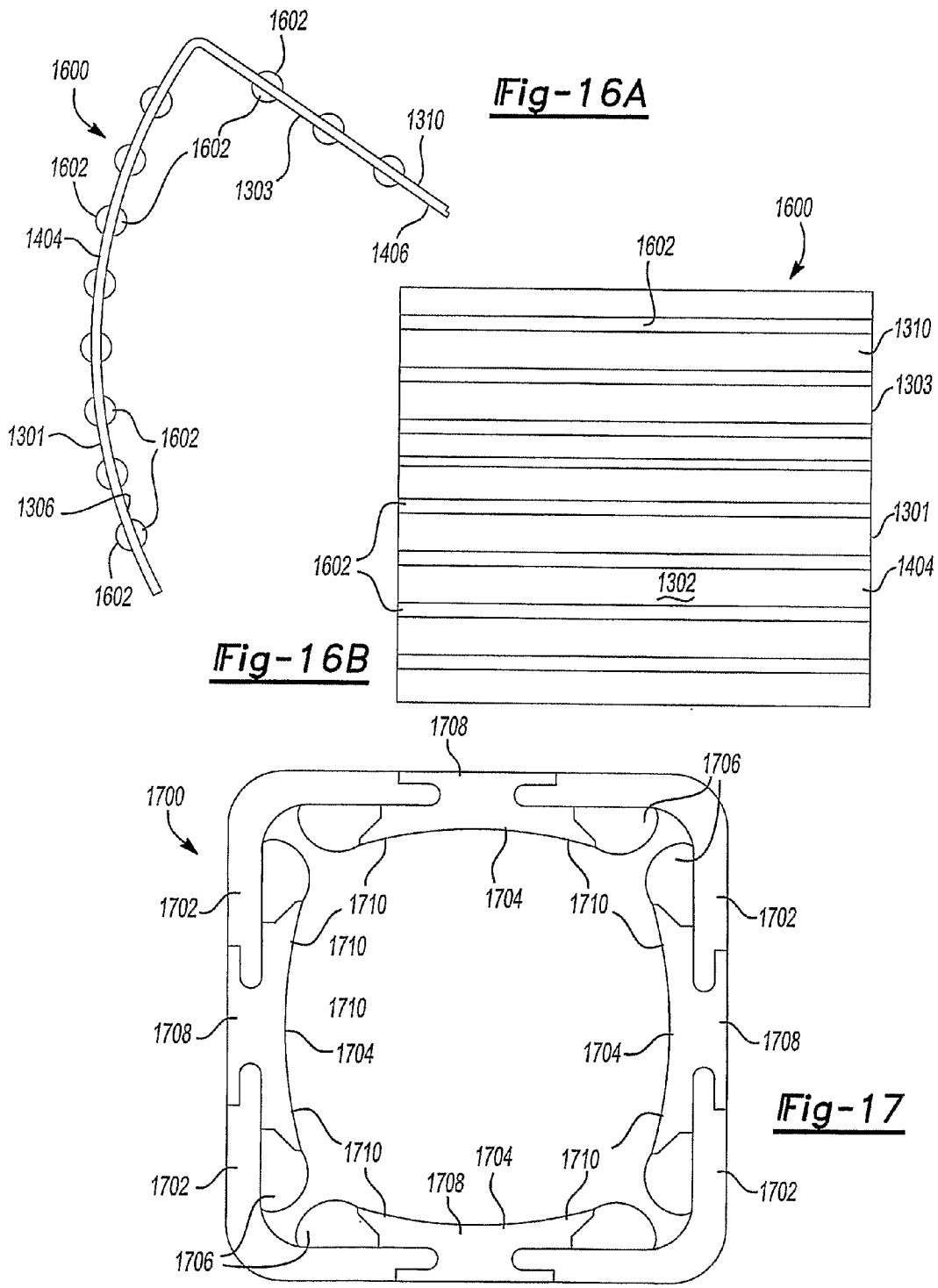

FIG. 34 Needle Wound, Single Piece 59mm Frame vs 4 Piece, Assembled 59mm Frame -- Power Comparison - 40 mm stack FIG. 35 Needle Wound, Single Piece 59mm Frame vs 4 Piece, Assembled 59mm Frame -- Maximum Watts Out at Thermal Equilibrium - 40 mm stack FIG. 36  Output Power Vs Stack Size Comparison - Needle Wound, Single Piece 59mm Frame vs 4 Piece, Assembled 59mm Frame - 31000RPM FIG. 37 Output Power Vs Stack Size Comparison - Needle Wound, Single Piece 59mm Frame vs 4 Piece, Assembled 59mm Frame - 32000 RPM FIG. 38 Output Power Vs Stack Size Comparison - Needle Wound, Single Piece 59mm Frame vs 4 Piece, Assembled 59mm Frame - 34000 RPM

POWER TOOLS WITH MOTOR HAVING A MULTI-PIECE STATOR

CROSS-REFERENCE TO RELATED APPLICATIONS

This application is a U.S. National Stage Application of International Application No. PCT/US2006/008063, filed Mar. 6, 2006, titled, "Power Tools With Motor Having A Multi-Piece Stator", which is a continuation-in part of application Ser. No. 10/934,334, titled, "Field Assemblies and Methods of Making Same," filed, Sep. 3, 2004; and a continuation-in-part of Ser. No. 10/934,104, titled, "Electric Motor with field Assemblies Having Core Pieces with Mating Features," filed, Sep. 4, 2004, and a continuation-in part of Ser. No. 10/934,333 titled "Electric Motor Having a Field Assembly With Slot Insulation" filed Sep. 3, 2004, all of which claim the benefit of U.S. Provisional Application Nos. 60/500,384, filed on Sep. 5, 2003, and 60/546,243 filed on Feb. 20, 2004. The present application also claims the benefit of U.S. Provisional Application No. 60/659,336 filed on Mar. 7, 2005 and of U.S. Provisional Application No. 60/660,114 filed on Mar. 9, 2005. The disclosures of the above applications are incorporated herein by reference.

FIELD OF THE INVENTION

The present invention relates to power tools, and more particularly, more ergonomic power tools utilizing a motor with separately formed return path pieces, pole pieces and field coils that are then assembled together to provide a higher power motor of a given size.

BACKGROUND OF THE INVENTION

Dynamoelectric machines are machines that generate electric power or use electric power. Common types of dynamoelectric machines are alternators, generators, and electric motors.

Electric motors are used in a wide variety of applications involving power tools such as drills, saws, sanding and grinding devices, and yard tools such as edgers and trimmers, just to name a few such tools. These devices all make use of electric motors having an armature and a field, such as a stator.

FIG. 1 shows a typical prior art stator 100 for an electric motor. Stator 100 is formed from a lamination stack 102 around which a plurality of windings of magnet wires 104 are wound to form field coils 114. Lamination stack 102 is formed by stacking together an appropriate number of individual laminations 108 and welding them together. The individual laminations 108 are typically made by stamping them from steel. To do so, loose laminations 108 are loaded in a stacker. The stacker picks up the appropriate number of laminations 108 and places them in a fixture where they are welded together. The laminations 108 are formed with slots so the resulting lamination stack 102 has slots 110 therein in which the magnet wires 104 are wound. Magnet wires, as that term is commonly understood, are wires of the type conventionally used to wind coils in electric machines, such as armatures and stators. Prior to winding the magnet wires 104, insulating sleeves or insulating slot liners (not shown), such as vulcanized fiber, are placed in the slots 110 and end rings 112 placed on the lamination stack 102. End rings 112 are illustratively made of plastic and formed to include coil forms 116. Field coils 114 are then wound by winding the magnet wires 104 in the slots 110. After the field coils 114 are wound, the end of the magnet wires 104 are appropriately terminated, such as to terminals 118 in a terminal post 120. The magnet wires 104 are then bonded together, such as by the application of heat when bondable magnet wires are used. Bondable magnet wires are magnet wires layered with a heat activated thermoplastic or thermoset polymer adhesive. One type of bondable magnet wires commonly used is wire available under the trade name BONDEZE from Phelps Dodge of Fort Wayne, Ind. Alternatively, the magnet wires 104 may be bonded by a trickle resin process described below. Where the stator 100 will be used in an application that exposes it to a particularly abrasive environment, such as a grinder, an epoxy coating is applied to the field coils 114 for abrasion protection.

As is known, motor output power is a product of motor speed and torque, so one approach to boosting output power is to change the windings of the coils so that the motor runs faster. However, this is often impractical as higher motor speeds puts greater stresses on gears, raises overall vibration levels, and may result in the speed of the tool exceeding rated speeds for associated accessories, such as drill bits, etc.

If any of these limitations exist and the motor speed cannot be increased, an alternative approach is to increase the stack length. There is a general relationship that provides that the motor output power is directly proportional to the product of the length of the stack of the motor's stator and the square of the armature diameter. For example, for a given motor speed the motor output power can be doubled by doubling the stack length or increasing the armature diameter by a factor of $\sqrt{2}$.

Increasing the stack length is not practical in many power tool applications because it may negatively impact the tool's ergonomics or increase the overall length of the tool to the point where it is cumbersome to use. For example, a reciprocating saw with an extended or longer body is more difficult to maneuver in tight spaces, such as cutting pipes in walls of buildings, etc.

While increasing armature diameter is an option to increase motor output power, this results in almost a linear increase in the diameter of the field or stator, which may again adversely affect the ergonomics of the tool.

SUMMARY OF THE INVENTION

A power tool in accordance with the invention has a motor having a stator made by separately forming pole pieces, return path pieces and field coils. The field coils are placed over necks of the pole path pieces and the return path pieces are affixed to the pole pieces. An armature having an outside diameter of at least 0.625 the outside diameter of the stator is placed in the stator. In an aspect of the invention, the field coils may be formed so that they extend beyond pole tips of the pole pieces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A-4C are perspective views of a stator being assembled in accordance with an aspect of this invention;

FIGS. 5A-5E are side section views of stator return path and pole pieces with mating features in accordance with an aspect of this invention;

FIG. 13 is a perspective view of an insulating slot liner in accordance with an embodiment of the invention;

FIG. 14 is a side view of the insulating slot liner of FIG. 13;

FIG. 15 is a cross-sectional view of a stator in accordance with an embodiment of the invention in which field coils are insulated by the insulating slot liner of FIGS. 13 and 14;

FIGS. 16A and 16B are side and front view of an insulating slot liner in accordance with an embodiment of the invention that is a variation of the insulating slot liner of FIGS. 13 and 14;

FIG. 17 is four pole stator formed in accordance with an embodiment of the invention;

DETAILED DESCRIPTION OF THE PREFERRED EMBODIMENTS

The following description of the preferred embodiment(s) is merely exemplary in nature and is in no way intended to limit the invention, its application, or uses.

Figure 2:
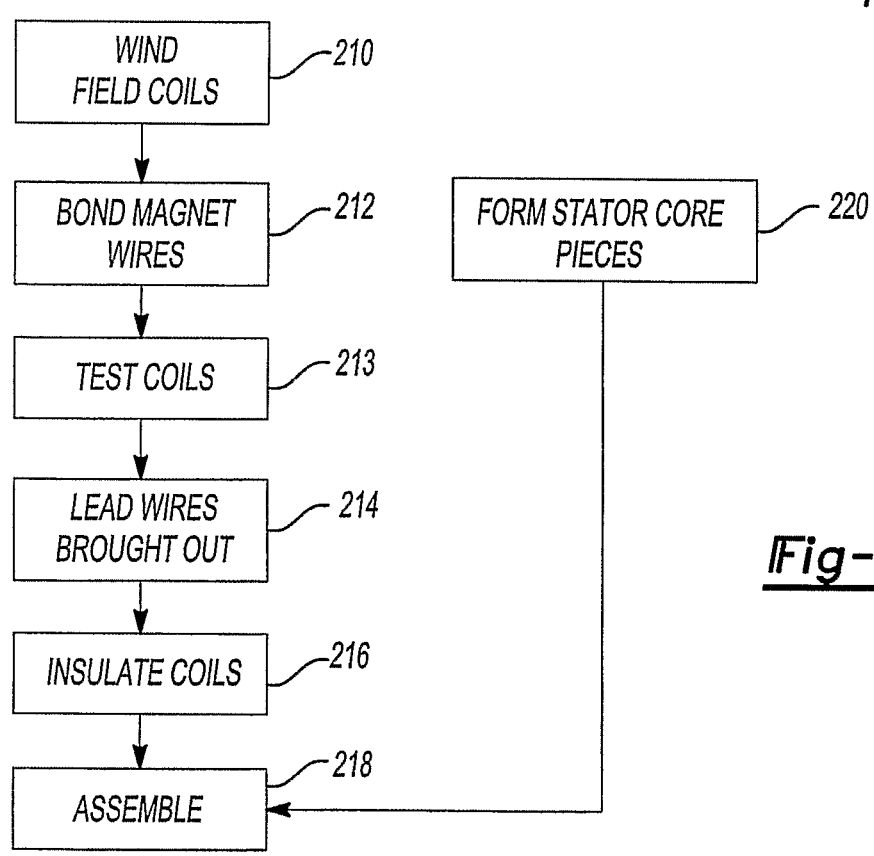
FIG. 2 is a flow chart of a method for forming a stator in accordance with an aspect of the invention.
Figure 3:
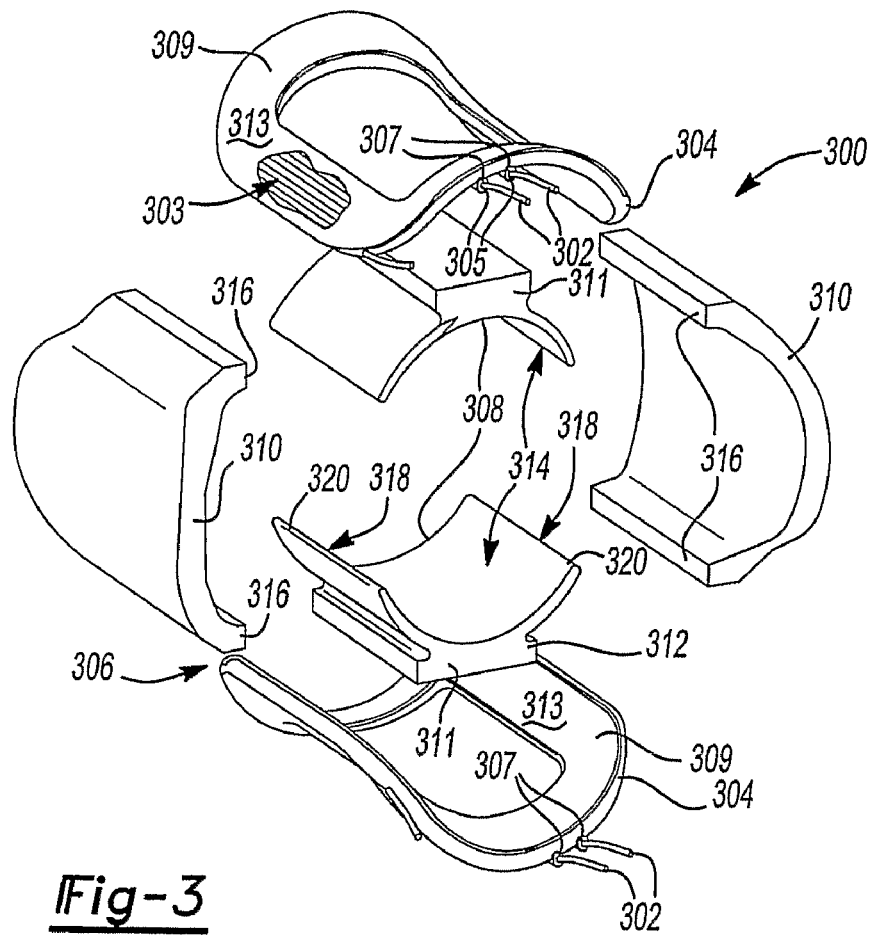
FIG. 3 is an exploded assembly view of a stator formed in accordance with the method of FIG. 2.

Referring to FIGS. 2 and 3, a process for making a field assembly, stator 300 in this instance, in accordance with an aspect of the invention is shown. At step 210, a coil, such as coil 614 (FIG. 6), for field coils 304 of stator 300 is wound to a predetermined shape, preferably net shape, by winding magnet wires 303 to the predetermined shape. "Net shape" means the final shape of the field coils 304 in an assembled stator 300. At step 212, the magnet wires 303 are bonded together. The magnet wires 303 are preferably bondable magnet wires, such as BONDEZE wires, having a layer of heat activated thermoplastic or thermoset adhesive thereon and heat is applied to the formed coil 614 to activate the adhesive on the magnet wires 303 to bond them together. It should be understood that the magnet wires can be bonded when the coil is still in the winding tooling or after it has been removed from the tooling. An advantage of bonding the wires when the coil is still in the winding tooling is that it assures that the coil maintains its shape when it is removed from the tooling. The coils may also be compressed during bonding. The bonded coil 614 is then tested at 213.

Field coils 304 have coil ends 305 with lead wires 302 extending therefrom which are brought out at step 214 from the formed coil 614. Lead wires 302 can be brought out using different alternatives. Coil ends 305 may illustratively be terminated at terminals 307 and lead wires 302 attached to the terminals 307. Lead wires 302 can be attached directly to coil ends 305. Lengths of coil ends 305 can be insulated by various methods, such as shrink tubing, various wall thickness TFE or PTFE tubing, and the insulated lengths provide the lead wires 302. The use of tubing, such as TFE or PTFE tubing, in addition to insulating the coil ends 305, further provides the advantages of strain relief and added rigidity to lead wires 302. Sliding tubing such as TFE or PTFE tubing over the coil ends 305 shields them and the tubing can be retained by any type of end termination.

At step 216, the formed coil 614 is insulated to form field coil 304. The formed coil 614 can be insulated by encapsulating it with an encapsulation material 309 that forms an encapsulation 313. The encapsulation material 309 is illustratively an elastomeric thermoplastic or thermoset plastic, such as thermoset liquid silicon rubber. Encapsulation material 309 is illustratively injection molded around field coils 304. It should be understood that other processes and materials can be used to encapsulate the formed and bonded coils with encapsulation material 309, such as transfer molding or spraying the encapsulation material 309. The encapsulation material could also be a more rigid thermoset. The encapsulation material may illustratively be thermally conductive and could also be a more rigid type of thermally conductive plastic, such as a Konduit® thermoplastic commercially available from LNP Engineering Plastics of Exton, Pa. The encapsulation material may illustratively be applied using the known vacuum impregnation process. The formed field coil 614 would be placed in a vacuum chamber and the encapsulation material wicks onto the field coil 614.

Encapsulating the field coils 304 with the appropriate encapsulating material enhances abrasion protection and improves tracking resistance. Some types of power tools, such as grinders that are used to grind metal and remove mortar between bricks (called tuck pointing), generate a lot of abrasive particles that are drawn into the motor during operation and thus pass over the stator and rotor coil windings. These particles abrade the insulation of the wire, and also tends to abrade the extra trickle varnishes or slurries that may be used to coat the coil windings. Eventually, the wires electrically short and the motor burns up, resulting in an inoperable power tool. Tracking is a condition where an alternate conductive path is created outside the motor, thus carrying electrical current where it normally doesn't go, such as outside of the motor windings. This path is normally created by metal debris drawing into the motor during operation of the power tool that collects in the tool housing and contacts exposed elements of the electrical system of the power tool, such as brush boxes, exposed motor field windings, and lead wires.

Silicon rubber, such as liquid silicon rubber, is one such encapsulating material that can be used to enhance abrasion protection and improve tracking resistance. Silicon rubber is an elastomeric material and cushions the particles drawn into the motor when the particles impact it. Using a grade of silicon rubber with an appropriate durometer gives a desirable balance of functionality in terms of mechanical strength, abrasion resistance, tear resistance, and manufacturability. Illustratively, the liquid silicon rubber has a durometer in the range of 40 to 70 Shore A, and illustratively greater than about 50, and a high tear strength, that is, a tear strength of 200 pounds per inch or greater. It should be understood that other elastomers having comparable properties can also be used as the encapsulating material. The silicon rubber, or similar elastomers, can be applied by various means in addition to injection molding, such as spray-on, brush-on and compression molding and can be cured by any appropriate method, such as heat cure, room temperature cure, moisture cure and UV light cure.

Figure 3A:
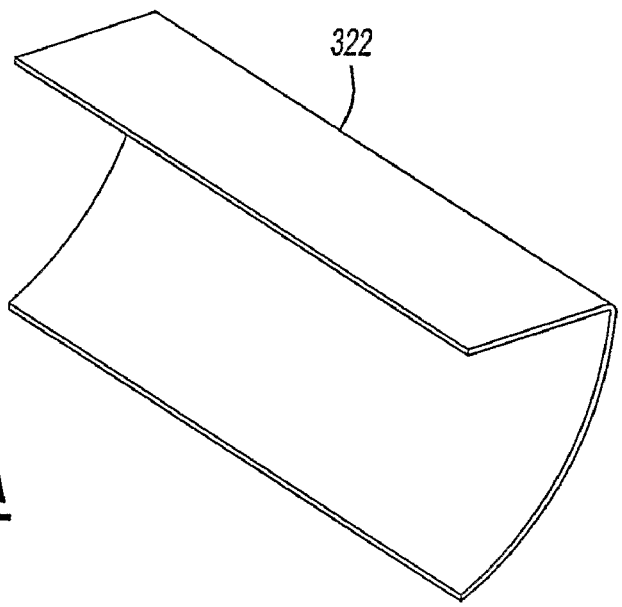
FIG. 3A is a perspective view of a slot liner.

Alternatively or in addition to encapsulating the field coils, insulating slot liners, such as slot liner 322 (FIG. 3A), can be placed in the slots of the stator core between pole pieces 308 and inner surfaces of return path pieces 310. Such a slot 503 is shown more specifically in the embodiment of FIG. 5A between pole pieces 404 and an inner surface 505 of return path pieces 402. The insulating slot liners may illustratively be known types of insulating slot liners, such as those made of fiber or rag-polyester.

Insulated field coils 304 are assembled with stator core pieces 306 to form stator 300. Stator core pieces 306 include pole pieces 308 and back iron or return path pieces 310.

Figure 7A:
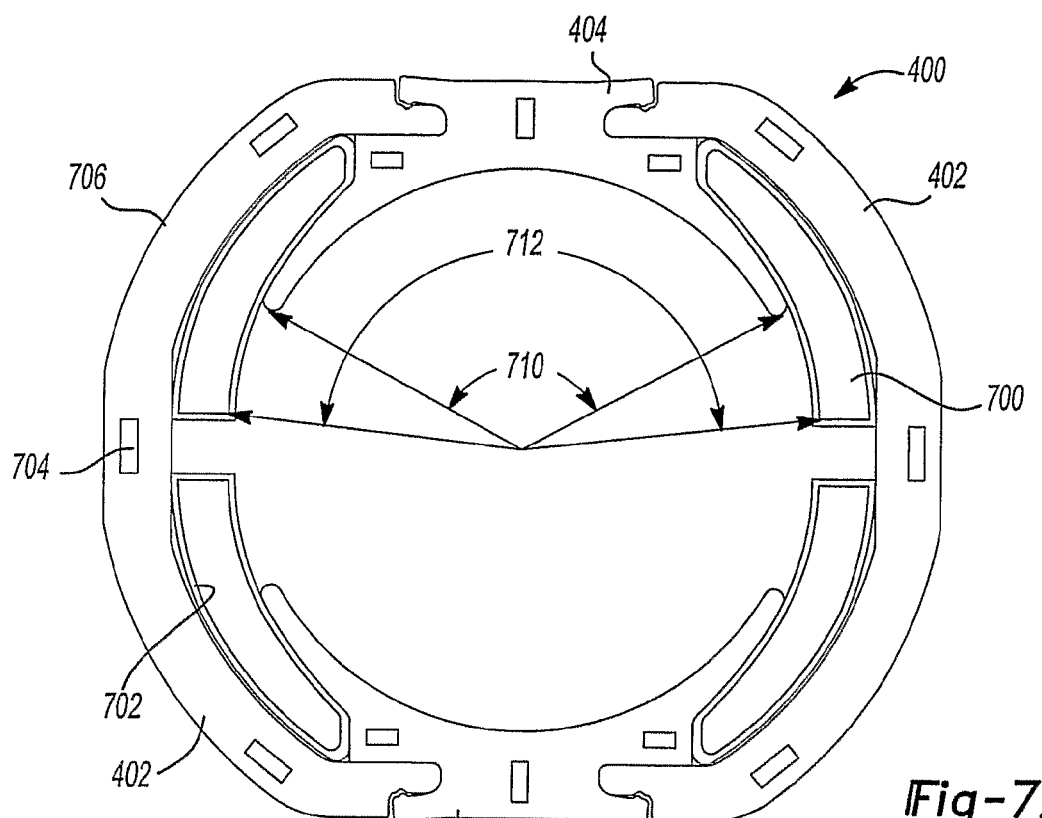
FIGS. 7A and 7B are side section views of a variation of the stator of FIG. 4 in accordance with an aspect of the invention.
Figure 7B:
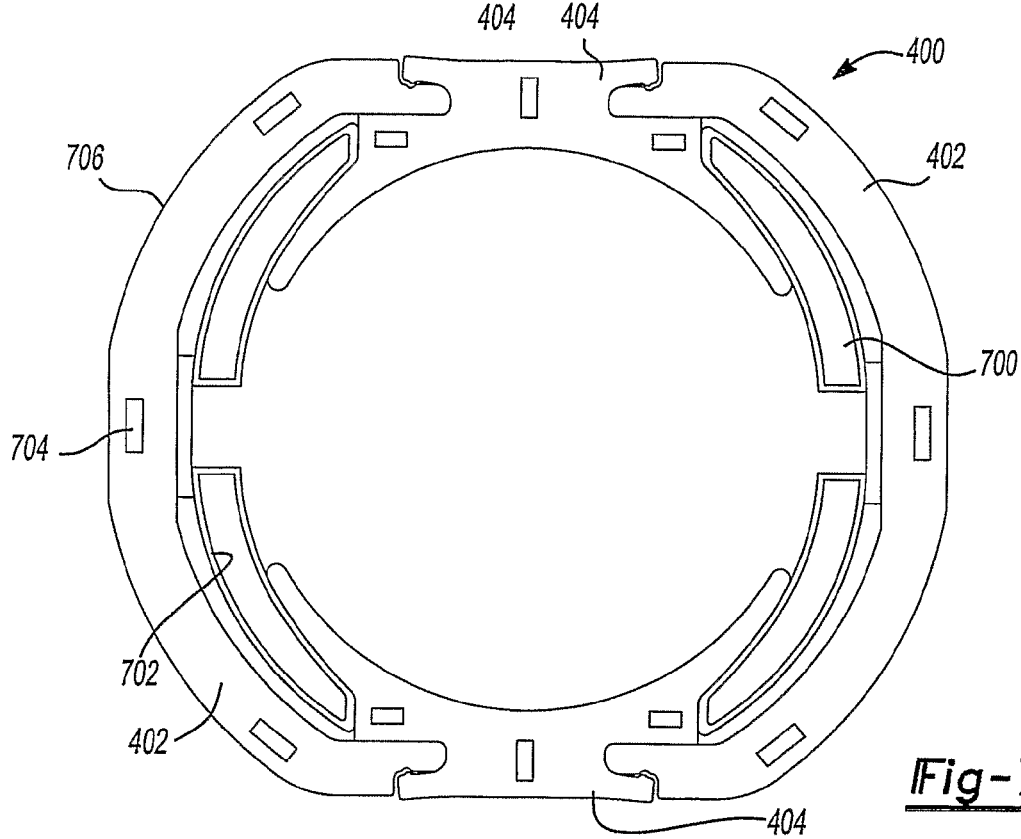

Stator core pieces 306 are formed at step 220 out of steel laminations, as discussed above. In this regard, the laminations can be stacked and bonded together, such as by welding, or the laminations 706 (FIGS. 7A and 7B) stamped with interlocks, such as interlocks 704 (FIGS. 7A and 7B), which interlock the laminations together as the laminations are stamped. Each core piece 306 may illustratively be seam welded separately across its laminations to strengthen it during handling, assembly of stator 300 and during operation of the motor in which stator 300 is used. Stator core pieces 306 can also be made by molding or pressing them out of an iron powder, illustratively, insulated iron powder, such as a sulfate coated iron powder. One such sulfate coated iron powder is SOMALOY™ 500 available from Höganäs AB of Sweden through its U.S. subsidiary, North American Höganäs, Inc., 111 Hoganas Way, Hollsopple, Pa. 15935-6416. It should be understood that stator core pieces 306 could also be formed from other iron powders that can be pressed or molded, such as sintered iron powder.

It should be understood that forming the stator core pieces 306 is illustratively carried out independently of forming field coils 304 and vice versa. Consequently, stator core pieces 306 and field coils 304 can be made on separate lines and stockpiled until needed. It also allows the geometry of field coils 304 and stator core pieces 306 to be optimized. Moreover, pole pieces 308 are illustratively made separately from return path pieces 310. This allows the geometry of the pole pieces 308 and the return path pieces 310 to be separately optimized. Preferably, the pole pieces 308 are identical as are the return path pieces 310 and the field coils 304.

Each pole piece 308 illustratively has a neck 311 with a rectangular outer base 312 with an inwardly opening arcuate cylindrical pole tip section 314 thereon having pole tips 318. Each return path piece 310 is illustratively semi-cylindrical with opposed ends 316 shaped to attach to one or both of the opposed ends 316 of the other return path piece 310 and the rectangular outer bases 312 of pole pieces 308. In assembling encapsulated field coils 304 and stator core pieces 306, encapsulated field coils 304 are placed over the necks 311 of respective pole pieces 308. Return path pieces 310 are then secured to pole pieces 308, such as by snapping together, welding, riveting, with screws, forming operations, or the like.

Figure 3B:
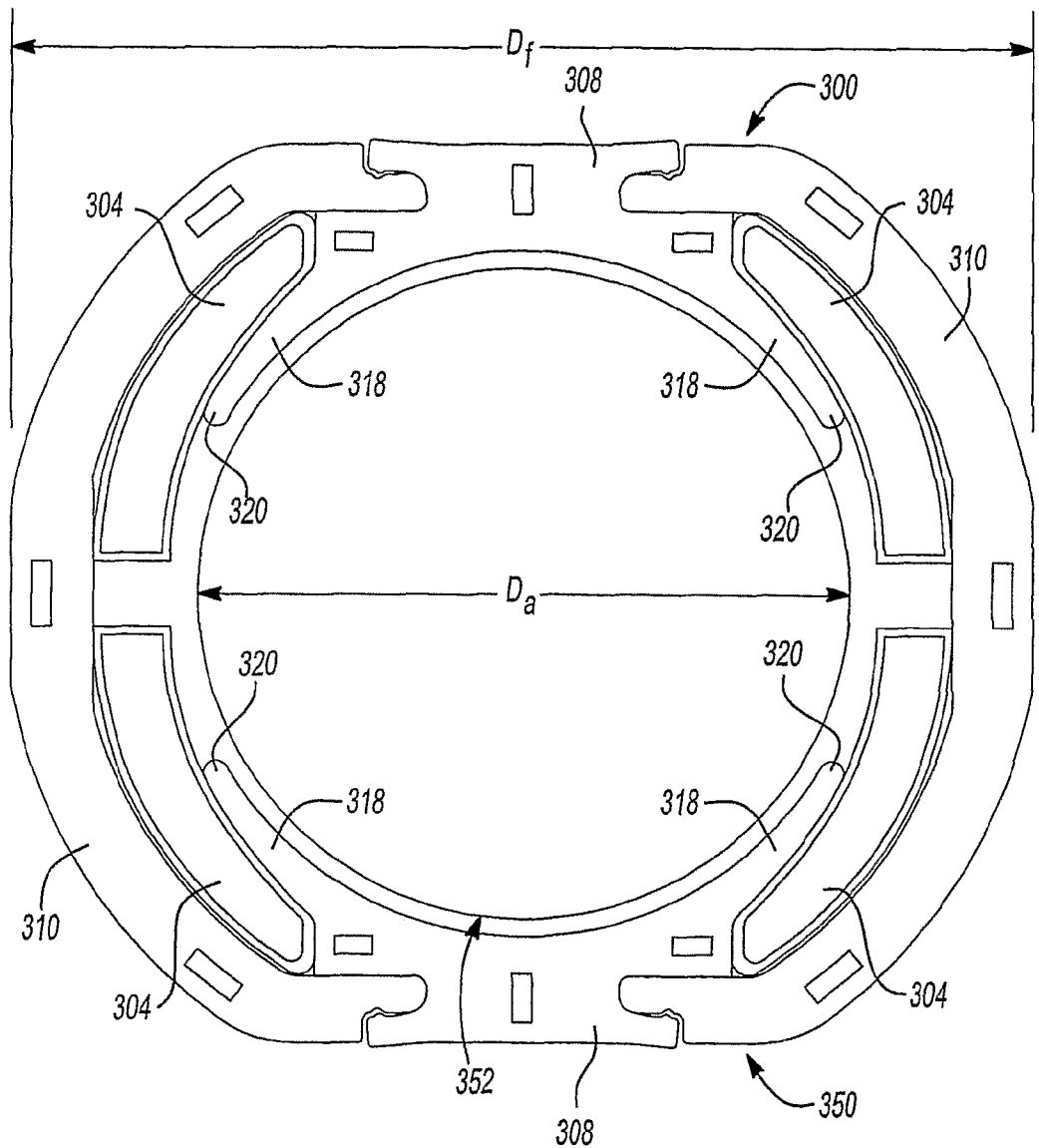
FIG. 3B is a top view of an electric motor made using the stator of FIG. 3.

An armature, such as armature 352 (FIG. 3B) is then placed in stator 300 in making an electric motor, such as electric motor 350 (FIG. 3B).

The process just described provides a number of advantages. A relatively simple, inexpensive machine can be used to wind the field coils 304. Moreover, multiple magnet wires can be wound at the same time to form the field coils 304. It also provides for a higher slot fill factor (total area of wire in the winding slot, including wire insulation, divided by available or total area of the winding slot), particularly when the wires of the coils are compressed during bonding. Looked at a different way, it provides for denser field coil that has a higher packing factor (total area of the wire, including wire insulation, divided by the area of the envelope of the field coil defined by the inner and outer perimeters of the field coil).

Compressing the wires during bonding improves bonding by assuring that adjacent wires of the coil are firmly together resulting in increased bond strength. Also, by pressing the wires of the coil together, many of the voids from the winding process are eliminated. This reduces or eliminates air pockets in the coil resulting in improved heat transfer because the inner wires of the coil are in direct contact with the outer wires, which are exposed to airflow when the motor is in operation. The resistive heat generated during operation of the motor can thus be dissipated through the coil quicker by being conducted through adjacent wires rather than convection through an air pocket. Finally, by compressing the wires of the coil together, a higher slot fill factor and packing factor can be achieved compared to conventional winding techniques. This allows for more turns of wire or equal turns of larger gauge (thicker) wire than provided by conventional winding techniques. Field coils having packing factors of greater than sixty, seventy, eighty and up to about eighty five percent can be achieved with this process.

In an aspect of the invention, multi-stranded wire is used to wind the field coils 304 which also provides for more slot fill. A commercially available wire of this type is commonly known as litz wire.

In an aspect of the invention, multiple magnet wires having different functions and, illustratively, different sizes, can be wound to form the field coils 304. For example, eighteen gauge magnet wire can be wound in each field coil 304 to form one or more coils that are energized to provide the magnetic field that interacts with the armature of the electric motor to rotate the armature. Twenty-one gauge wire can be wound in each of field coils 304 to form coils that are energized to brake the armature. In this regard, the magnet wires of different sizes are wound sequentially, that is, first one size of magnet wire is wound and then the second size of magnet wire is wound, or they are wound at the same time. The twenty-one gauge wire is illustratively wound with more turns than the eighteen gauge wire to produce the needed amount of flux to brake the armature quickly.

Forming the field coils 304 into predetermined shape(s), such as by winding them to pre-determined shape(s), and then bonding the magnet wires 303 allows the field coils 304 to be wound so that they extend beyond edges 320 of pole tips 318 of pole pieces 308 when field coils 304 are assembled in stator 300. That is, the field coils 304 can extend beyond the edges 320 of pole tips 318 of pole pieces 308. In this regard, the return path pieces 310 may be formed so that they are axially longer than the pole pieces 308. This also allows the magnet wire to be wound so that the field coils 304 extend around or beyond ends of the pole pieces 308 and not extend beyond the edges of the return path pieces 310 once they are assembled in stator 300. Also, the coil forming step allows the field coils 304 to be formed more compactly, as discussed, and thinner. By being able to form the field coils 304 so that they extend beyond edges 320 of pole tips 318 of pole pieces 308 and be more compact, applicants have determined that at least ten percent more output power can be achieved as well as providing better thermal characteristics for a given size field. For example, applicants found that an electric motor having a 59 mm diameter stator made in accordance with the invention has about thirty-six more percent output power than an electric motor having a 59 mm diameter conventionally made stator. This also permits a smaller diameter stator to be used for a given amount of output power. For example, applicants found that an electric motor having a 55 mm diameter stator formed according to the invention has about the same output power as an electric motor having a 59 mm diameter conventionally formed stator.

Forming the field coils 304, illustratively into net shapes, and then assembling the field coils to the pole pieces also allows the overall diameter of stator 300 for a given diameter motor to be kept the same but allows a larger diameter armature to be used. As is known, the maximum motor performance measured by cold or hot max watts out increases as the size of the armature increases. More specifically, as the diameter of a motor armature increases, the power of a motor goes up by the square of the armature diameter. But with conventional motors, every incremental increase in the diameter of the armature results in a corresponding increase in the diameter of the stator and thus of the motor. A motor using a stator made in accordance with the invention discussed above and as further discussed below allows the windings of the field coils, such as field coils 304, to be packed more tightly. It also allows them to be packed more thinly which in turn allows the thickness of the stator core pieces to be reduced. Packing the windings of the field coils 304 thinner allows, as discussed above, the diameter of the motor to be reduced or a larger diameter armature used for a given diameter motor. The above motor having a 55 mm diameter stator constructed in accordance with this invention (which is also the diameter of the motor) for use in a small angle grinder provides a power output of about 1000 W. To achieve a power output of 1000 W using a conventional stator requires a 59 mm stator.

Using the above referenced motor with the conventional 59 mm diameter stator as an example, which has field coils wound about the pole tips of the poles by a needle-winder as is conventional, this motor has a total slot area for the field coils (slot area being the area in which the field coils can be disposed which in the case of the conventional needle wound field is limited by the width or arc of the pole tips of the poles) of about 90 mm$^2$ and radial dimensions as follows:

| | |
|---|---|
| Armature radius: | 17.5 mm |
| Airgap | 0.5 mm |
| Field coil thickness: | 6.5 mm (includes thickness of pole tip) |
| Back iron thickness: | 5 mm |

(The air gap is the gap between the field coils or faces of the pole tips, whichever is closer to the armature, and the armature.)

The above referenced motor with the 55 mm diameter stator made in accordance with this invention where the field coils 304 can extend beyond the edges 320 of the pole tips 318 has a total slot area for the field coils of about 100 mm$^2$ with the following radial dimensions:

| | |
|---|---|
| Armature radius | 17.5 mm |
| Airgap | 0.5 mm |
| Coil thickness | 4.5 mm (includes thickness of pole tip) |
| Back iron thickness | 4 mm |

The armature winding in both cases is eight turns of 0.52 mm wire and winding of each field coil in both cases is sixty-two turns of 0.75 mm wire.

Alternatively, a 59 mm diameter stator constructed according to this invention could be used allowing for the diameter of the armature to be increased 4 mm, with a commensurate increase in power.

Table 1 below shows the armature OD, Field OD, Armature OD/Field OD ratio, and power output at 38,000 RPM for conventional AC motors having a Field OD of 57 mm and 59 mm and Table 2 below shows the same information for AC motors with fields made in accordance with the foregoing aspect of the invention having a field O.D. of 55 mm and 59 mm.

TABLE 1

| Field O.D. | Armature O.D. | Ratio | RPM | Watts |
|---|---|---|---|---|
| 56.96 mm | 35.19 mm | 0.618 | 38000 | 800 |
| 59.00 | 35.19 mm | 0.596 | 38000 | 1000 |

TABLE 2

| Field O.D. ($D_f$) | Armature O.D. ($D_a$) | Ratio | RPM | Watts |
|---|---|---|---|---|
| 55.00 mm | 35.19 mm | 0.640 | 38000 | 1050 |
| 59.00 | 37.00 mm | 0.627 | 38000 | 1600 |

Referring to the AC motor having a 59 mm field O.D. as an example, as can be seen from Tables 1 and 2, the motor made in accordance with the foregoing aspect of the invention allows use of a 37 mm O.D. armature with a commensurate increase in power to 1600 Watts at 38,000 RPM compared to a conventional AC motor which utilizes a 35.19 mm O.D. armature and has a power output of 1000 Watts at 38,000 RPM. Also as can be seen from Tables 1 and 2, a motor having a 55 mm O.D. field made in accordance with this aspect of the invention allows use of a 35.19 mm O.D. armature resulting in a power output of 1050 Watts at 38,000 RPM, which is more than 1.25 times the power of an existing AC motor having a 56.96 mm O.D. field which also uses a 35.19 mm O.D. armature. In accordance with the foregoing aspect of the invention, for a given motor volume (motor outside diameter×motor length) an AC electric motor 350 (FIG. 3B) made in accordance with the foregoing aspect of the invention has an armature 352 and a field or stator 300 with an armature O.D. ($D_a$) to field O.D. ($D_f$) ratio of at least 0.625 which results in motor 350 having at least 1.3 times the power of an existing AC electric motor with a field having the same O.D. but with the smaller O.D. armature. The motor is also thermally balanced with the operating temperature of the field being about the same as the operating temperature of the armature at the current or power rating of the motor, such as the Underwriter Laboratories' rating for the motor.

Forming the stator core pieces 306 separately from each other and particularly from the field coils 304 decouples an important aspect of the design and configuration of the field coils from the design and configuration of the stator core pieces 306, the pole pieces 308 in particular. In conventional stators with needle-wound field coils, the field coils can't extend beyond the edges of the pole tips since the pole tips are used to hold the wires of the field coils during winding and before bonding or application of the trickle resin. The usable field winding area is thus defined by the width or arc (included angle) of the pole tips. While the arc of the pole tips can be increased to increase the area in which the field coils can be wound, this causes performance problems, particularly, commutation performance. Extending the arc of the pole tips too much degrades commutation. Thus, commutation performance limits the degree to which the area in which the coils are wound can be increased by increasing the arc of the pole tips. In this regard, it has been shown that narrower, reduced span pole faces can be beneficial for commutation in terms of reduced arcing, better brush/commutator life and less electrical noise. However, in conventional needle wound fields, this reduces the available field winding area and therefore limits the output power that can be achieved.

In universal motor commutation, the carbon brushes and commutator provide a means to provide power to the rotating armature and a means to smoothly reverse the current flow in appropriate armature coils as it rotates. This reversal occurs as the commutator bars attached to these coils pass beneath the carbon brushes and are effectively shorted for a brief period of time. From a design standpoint, managing the power dissipated during this commutation is critical to reducing arcing, delivering adequate brush life and minimizing electrical noise. The latter is an important design consideration for some markets, where local compliance agencies have set limits on the level of noise that is acceptable and mandate additional measures/components to suppress it to an acceptable level.

Forward biasing the motor is a common technique to improve commutation. This is done by shifting the connection of the winding to the commutator or moving the physical location of the brushes. This has the effect of moving the shorted coil (when a brush bridges two commutator bars) into the weak trailing edge of the field flux. The back EMF produced in the shorted coil counteracts some of the commutation voltage and reduces arcing. The disadvantage is that the motor has a definite directional bias and thus has poorer commutation in one direction than the other.

Two approaches are often used to manage the effects of forward biasing the motor. The first is to provide a reversing brush ring, a device that physically moves the location of the brushes depending on the selected motor run direction. This ensures that the brush location and associated motor bias are appropriate for the direction the motor is running. It has the disadvantage of the associated cost, size and reliability concerns associated with this additional mechanism.

The second approach that is commonly used in reversing applications, particularly where variable speed switches are employed, is a physical limit on the switch travel when it is in reverse mode. This limits the power and speed of the motor in the reverse direction so that even though the motors forward bias produces poor commutation in reverse, the power and associated electrical noise is limited. One disadvantage of this method is that depending on the severity of the arcing in the reverse direction, the switch travel may be limited to a point where it becomes a nuisance to the user. Consider for example driving a screw in the forward direction and finding that the power is so limited in reverse that the tool can not back the screw out.

It has been shown that reducing the pole face span has a beneficial impact on commutation. One measure of this impact is No Load (NL) Arcing, the power lost (in Watts) due to arcing when the motor is running at its no load speed.

Figure 39:
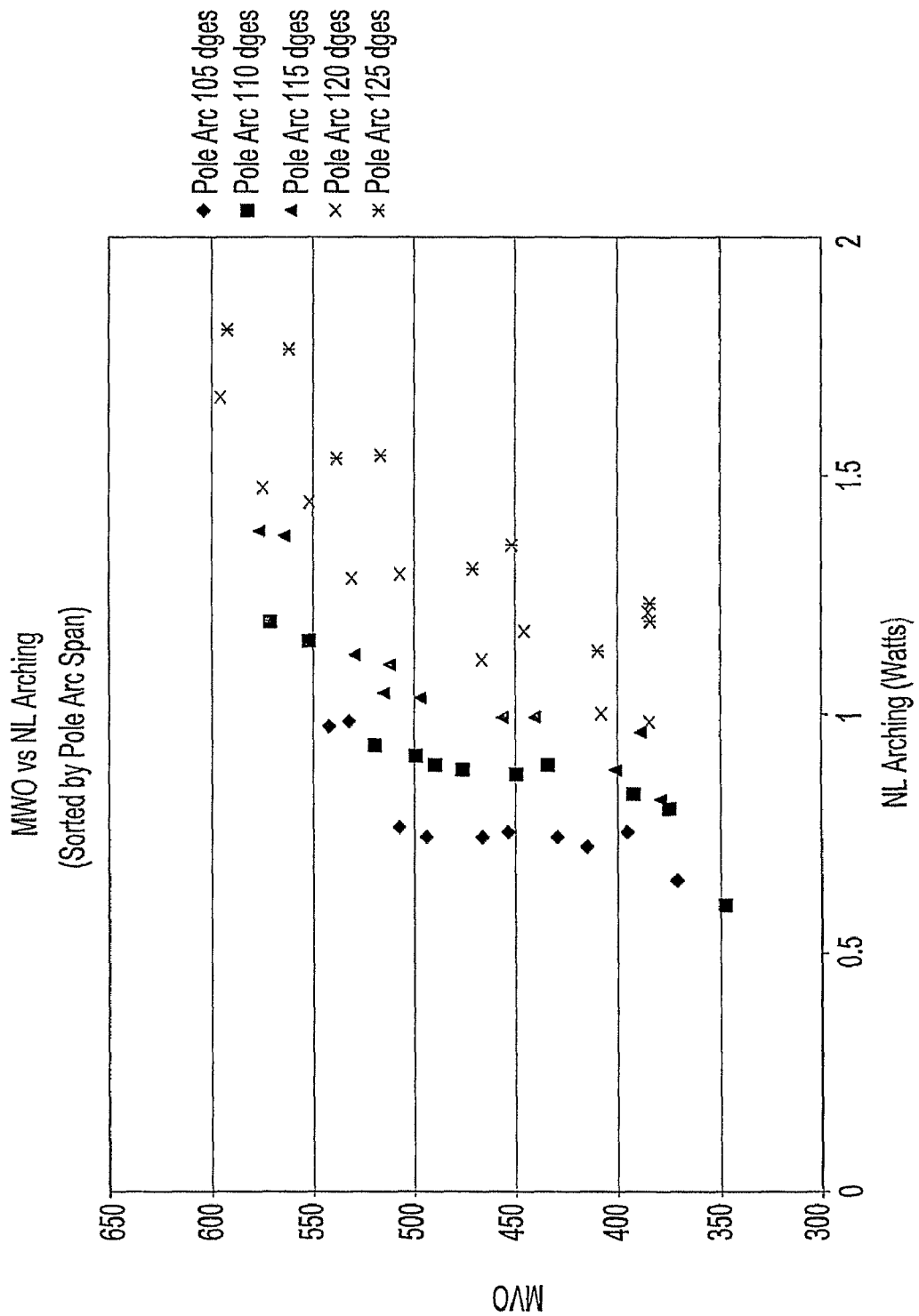
FIG. 39 is a graph showing comparing maximum watts out to no-load arcing for a motor in accordance with an aspect of the invention.

In FIG. 39, a motor having a multi-piece stator in accordance with the invention is considered, having a field diameter of 59 mm and a stack length of 35 mm. In all cases, the motors considered have a maximum no-load speed of approximately 29,000 rpm and all the motors are neutral wound, meaning they have no directional bias and performance should be similar whether the motor is run in forward or reverse.

Figure 37:
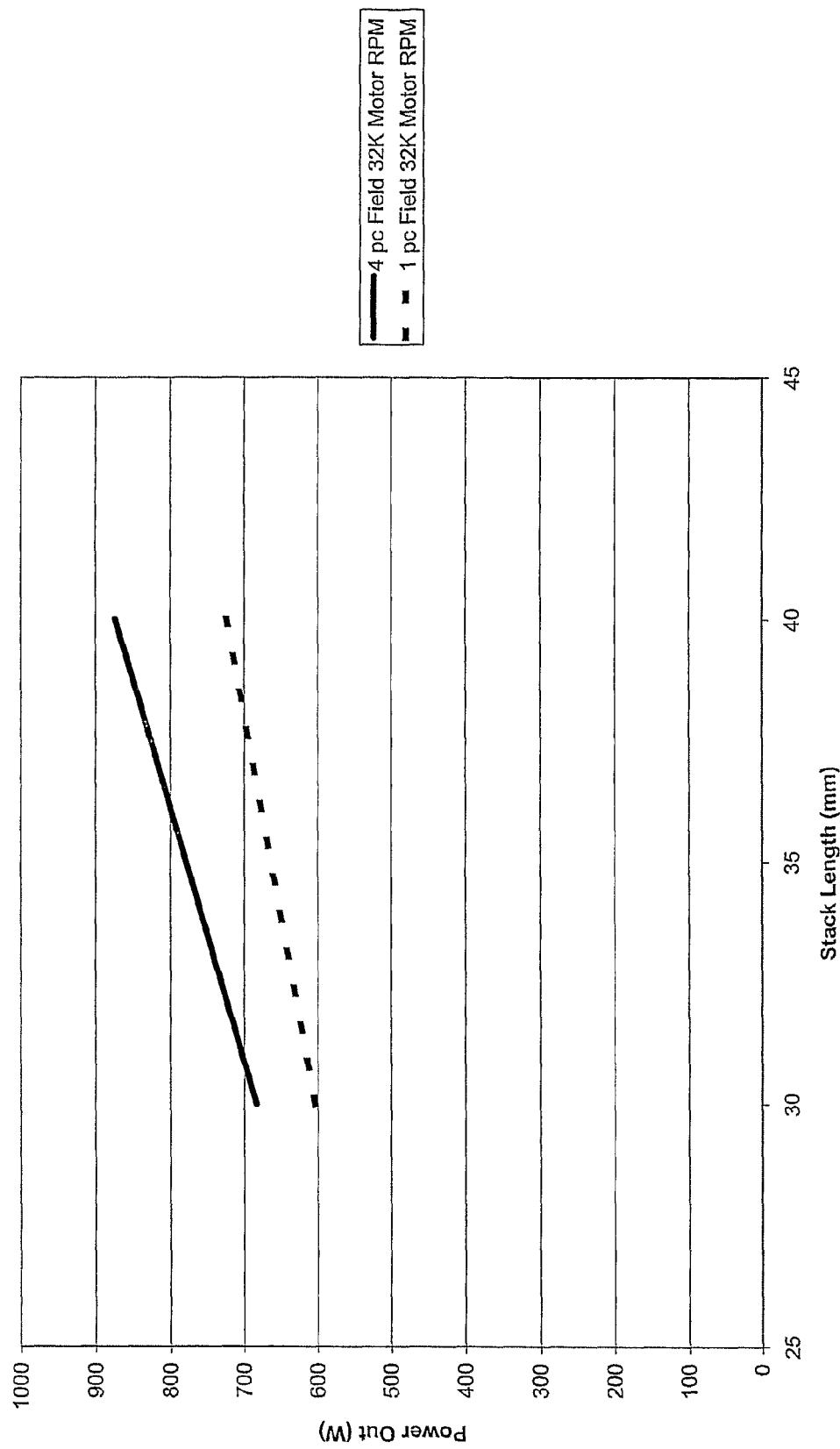
FIG. 37 is a graph comparing power output of a prior art motor to a motor in accordance with the invention at various stack lengths where the motors are wound to run at a maximum no-load speed of 32,000 rpm.

From FIG. 37, it can be seen that at any given power output the commutation improves i.e. NL Arcing drops, when the pole face span is reduced. In conventional needle wound fields there is the further limitation that the Maximum Watts Out (MWO) will also reduce because the available field winding slot area is reduced. FIG. 37 shows that by using a motor having a multi-piece stator in accordance with the invention the benefits of improved commutation can still be achieved without sacrificing winding area or MWO. Conventional field designs typically employ pole spans of between 120 and 130 degrees while in this particular example the optimal span was found to be 115 degrees. This offered the best balance between commutation performance, power and mechanical stability around the coil.

A motor having a multi-piece field in accordance with the invention provides greater flexibility in motor design to optimize output power in a given package while delivering commutation that meets the specified life and EMI requirements. This provides the advantages of either eliminating the need for either of the two conventional approaches described above to manage the commutation trade-offs or indeed complimenting them to deliver even greater performance, in output power and/or life while maintaining acceptable EMI output.

In an embodiment, a stator made in accordance with the invention as described above and below, such as stator 300, the arc of the pole tips does not limit the area in which the field coils can be disposed, and thus does not limit the size of the field coils 304. As discussed, the field coils 304 can be formed so that they extend beyond the edges 320 of the pole tips 318. That is, the arc or included angle of the field coil is greater than the arc or included angle of the pole tips. Thus, in a two pole stator such as stator 300, the two field coils 304 can be formed so that their respective edges are almost adjacent each other, that is, each field coil 304 has an arc (included angle) of almost one-hundred and eighty degrees, as shown representatively by field coils 614 in FIG. 15. Comparing the above discussed 55 mm motor having a stator made in accordance with this invention to the above discussed 59 mm motor having a conventional needle-wound stator, the pole tips of the 55 mm motor have an arc or included angle 710 (FIG. 7A) of 110 degrees and the field coils have an arc or included angle 712 of 158 degrees, whereas the field coils of the conventional 59 mm motor have an arc or included angle of 125 degrees which is the arc or included angle of the pole tips. Stators made in accordance with this invention can have field coils that have arcs or included angles of that are more than 100% of the arcs or included angles of the pole tips and up to about 163% of the arcs or included angles of the pole tips, such as, by way of example and not of limitation, at least 110%, 125%, 140%, 155% of the arcs or included angles of the pole tips.

Forming the field coils 304 before assembling them in stator 300 also provides the advantage of simplifying "leading" them. "Leading" the field coils 304 is the process of bringing out or attaching lead wires, such as lead wires 302. In conventional stators where the field coils are needle-wound around the poles, a length of the magnet wire must be brought out from the wound coil and either attached to a terminal placed in the end ring or if used as the lead wire, terminals attached. If the magnet wire is used as the lead wire, it must be strain relieved. This process typically results in a length of wire (magnet wire, lead wire, or both) that is longer than needed for the actual lead wire which must then be routed through the stator to secure it and keep it from touching the armature when the motor in which the stator is assembled in use. In contrast, by forming field coils 304 separately from the stator core pieces 306 and before they are assembled in stator 300, the "leading" process is simplified as it is much easier to get access to the coil since it is not in the stator. The lead wire can be attached directly adjacent the coil with little magnet wire needed to be brought out from the coil. If the magnet wire is used as the lead wire, only the length needed for the lead wire need be brought out. A further advantage is that if an unrepairable mistake is made in "leading" the field coil 304, only that field coil 304 need be scrapped and it can be scrapped without any disassembly. In contrast, if a mistake is made in leading a field coil in a conventional stator, either the entire stator has to be scrapped or the field coils disassembled from the stator and new field coils wound, which is usually impractical if not impossible.

Pressing the stator core pieces 306 out of iron powder provides additional advantages to those described above. The stator core pieces 306, the pole pieces 308 in particular, can be formed in one operation as a three-dimensional part. In contrast, in the conventional process described above, the pole pieces of the stator are made by stacking an appropriate number of laminations, in effect, stacking the appropriate number of two-dimensional pieces to arrive at the resulting three-dimensional pole piece. By pressing the stator core pieces 306 from iron powder, tighter tolerances can be maintained than with the conventional process.

Using insulated iron powder as the iron powder provides additional advantages in that insulated iron powder has low eddy current losses.

FIGS. 4A-4C show a variation of the above described aspect of the invention. A field assembly, stator 400 in this instance, has first and second return path pieces 402, first and second pole pieces 404, and first and second field coils 406. Field coils 406 are illustratively pre-formed coils encapsulated with an elastomeric encapsulation 408. Field coils 406 are illustratively wound to the predetermined shape as described above with reference to the embodiment shown in FIG. 3. Illustratively, elastomeric encapsulation 408 is liquid silicon rubber, as described above. It should be understood that field coils 406 can be insulated in other manners as described above.

Figure 5D:
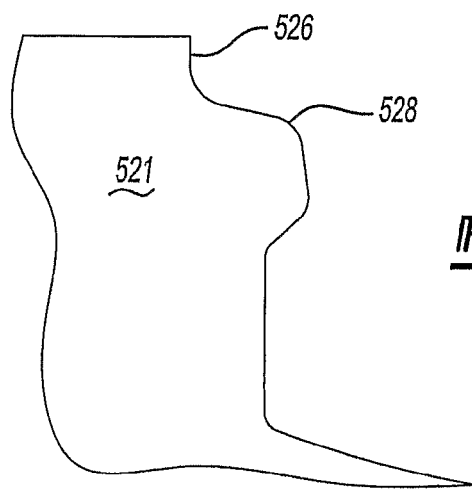

To assemble stator 400, field coils 406 are placed over necks 414 of pole pieces 404. Necks 414 have opposed receiving pockets 504 (FIGS. 5A-5C) therein between pole tip section 522 of pole pieces 404 and base portion 524 of necks 414 of pole pieces 404. Circumferentially and radially outer edges 526 of pole tip section 522 project circumferentially outwardly to provide lips 528 (in other words, pole tip portions 522 have undercuts 527). Edges 526 may illustratively be recessed and have a radius as shown in FIG. 5D to ease the assembly of field coils 406 to pole pieces 404. If edges 526 are sharp edges, the insulation on field coils 406 could catch and possibly be displaced from its correct position on the coil. With edges 526 having a smooth radius, the insulation on field coils 406 more freely slides onto pole pieces 404 and facilitates keeping the insulation correctly positioned on field coils 406.

Field coils 406, when encapsulated with an elastomeric encapsulation material such as liquid silicon rubber, snap over lips 528 and into undercuts 527 which retains them in place during further assembly of stator 400. Bumps or other interference features may illustratively be formed of the encapsulation material where the field coils abut the pole tip portions 522 to further retain the field coils 406 to the pole pieces. In a variation, lips 528 may also be staked over field coils 406 in one or more places, shown illustratively at 529, to provide further retention of field coils 406 as shown in FIG. 5F.

Ends 418 of field coils 406 may extend beyond pole tips 420 of pole pieces 404. Return path pieces 402 are then brought in radially (laterally) and mated to the pole pieces 404. Opposed edges 423 of radial outer ends 422 of pole pieces 404 have mating features 424 that mate with corresponding mating features 426 in edges 428 of return path pieces 402, as described in more detail below.

In an aspect of the invention, field coils 406 may have mating features 410 formed in encapsulation 408. Pole pieces 404 have corresponding mating features 412 formed therein, and in this regard, pole pieces 404 may be encapsulated with an encapsulation material with the mating features 412 formed in this encapsulation, or the mating features 412 formed directly in the soft magnetic material of which pole pieces 404 are made. Mating features 410 may illustratively be a projection or detent and mating feature 412 would then be a corresponding hole or recess. The converse could also be used—that is, mating feature 412 is the projection or detent and mating feature 410 is the corresponding hole or recess. Mating features 410 of field coils 406 and mating features 412 of pole pieces 404 mate together when field coils 406 are placed over the necks 414 of pole pieces 404, holding each field coil 406 to a respective pole piece 404, making coil/pole subassemblies 416. Pole pieces 404 may illustratively be made of laminations or of iron powder, such as insulated iron powder, such as described above with reference to FIGS. 2 and 3. Similarly, return path pieces 402 can be made of laminations or insulated iron powder.

Turning to FIGS. 5A and 5B, an embodiment of mating features 424, 426 is shown. Mating feature 426 of each edge 428 of each return path piece 402 is a projection 500 that extends from the respective edge 428 of the return path piece 402, with a recess 502 at a junction of projection 500 and edge 428 of return path piece 402. Mating feature 424 in each opposed edge 423 of each radial outer end 422 of each pole piece 404 (FIG. 4B) comprises receiving pocket 504 defined between outer finger 506 of base portion 524 of pole piece 404 and pole tip portion 522 of pole piece 404. Mating feature 424 further includes outer finger 506 having a projection 510 extending radially inwardly from an outer end 512 of finger 506.

Each receiving pocket 504 is illustratively larger than the projection 500 of the respective return path piece 402 so that projection 500 is easily received in the receiving pocket 504. This is accomplished by forming finger 506 so that it is at an angle 514 with respect to projection 500, as shown in FIG. 5B, when projection 500 is first inserted into receiving pocket 504. Additionally, mating radii of receiving projection 500 and receiving pocket 504 are sized so that there is always an appropriate clearance 516 between them taking tolerances into account.

Once the projections 500 of return path pieces 402 are inserted into receiving pockets 504 of respective pole pieces 404, the fingers 506 of pole pieces 404 are deformed radially inwardly so that projections 510 extending radially inwardly from outer ends 512 of fingers 506 are received in recesses 502 of respective return path pieces 402. The mating of projections 510 in recesses 502 forms mating detents 518 (FIG. 5A) that mechanically lock pole pieces 404 and return path pieces 402 together. Return path pieces 402 and pole pieces 404 are thus mechanically interlocked by mating detents 518 and held together by friction. Pole pieces 404 can also be welded to return path pieces 402 to further strengthen the attachment of pole pieces 404 to return path pieces 402. Alternatively, pole pieces 404 and return path pieces 402 could just be welded together.

FIG. 5C shows a variation of the mating features 424, 426 of FIGS. 5A and 5B which is almost identical to the embodiment shown in FIGS. 5A and 5B, and only the differences will be discussed. Elements of FIG. 5C common with the elements of FIGS. 5A and 5B are identified with the same reference numbers. The difference is that the mating detent 518 is moved distally outwardly along projection 500. This increases the "critical length" designated by reference numeral 520 compared with the length of the same segment in the embodiment shown in FIGS. 5A and 5B. This critical length is the length of the segment of return path piece 402 and pole piece 404 through which the majority of the magnetic flux is carried. Maximizing this critical length benefits motor performance.

Illustratively, when return path pieces 402 are mated with pole pieces 404, they are brought together radially shown by arrow 440 in FIG. 4B, as opposed to axially. The return path piece 402 radially compresses respective sides of the field coils 406 mounted on pole pieces 404. This eliminates the return path piece 402 sliding axially across the field coils 406 and the possible damage to the insulation surrounding the field coils 406 due to the return path piece 402 sliding across them. Also, the tolerances, particularly of the field coils 406, can be somewhat looser when the return path pieces 402 and pole pieces 404 are mated by bringing them together radially as opposed to axially.

Making the return path pieces 402 separately from the pole pieces 404 also provides the advantage that not only can different materials, such as different magnetic grades of steel, be used to make them, but different construction techniques can be used. For example, the pole pieces 404 could be made of stacks of laminations as described above and the return path pieces made of solid steel. The pole pieces 404 would then include deformable portions that would be deformed against corresponding portions of return path pieces 402 to fasten the return path pieces 402 and pole pieces 404 together.

While stators 300 and 400 (FIGS. 3 and 4) have been described in the context of having two poles with two return path pieces and two pole pieces, it should be understood that other configurations can be used that are within the scope of the invention. For example, only one return path piece could be used, which would illustratively be a cylindrical piece, with the two pole pieces being affixed to an inner side of the return path piece on opposite sides thereof. Each return path piece could be made of multiple pieces that are joined together, such as by welding or by forming mating features therein that snap together. The stator core pieces could also be held together by being inserted in a stator housing. The stators could also have more than two poles, such as four, six, eight or other multiples of two. In this regard, at least one pole piece would be provided for each pole and they would be spaced equidistantly around the stator. Each pole piece could be made of multiple pieces that are joined together.

FIG. 17 shows such a stator 1700 having more than two poles, illustratively, four poles. Stator 1700 illustratively includes four return path pieces 1702, four pole pieces 1704 and four field coils 1706. Return path pieces 1702, pole pieces 1704 and field coils 1706 are all separately formed in the manner described above. Field coils 1706 are then placed over necks 1708 of pole pieces 1704 so that they abut pole tips 1710 of pole pieces 1704 and pole pieces 1704 and return path pieces 1702 mated together.

In an aspect of the invention, the core pieces of the stator include at least three pieces—two pole pieces and one return path piece. In an aspect of the invention, the pole pieces, return path piece or pieces and the field coils are all separately formed and then assembled together. By separately formed, it is meant that the pole pieces are formed separately from the return path piece or pieces which are in turn formed separately from the field coils.

FIG. 6 shows an illustrative embodiment of a mold 600 that can be used to mold the encapsulation material, such as encapsulation material 309 (FIG. 3) that forms the encapsulation, particularly when an elastomeric encapsulation material such as liquid silicon rubber is used. Mold 600 has a core plate 602 having a plateau 604 from which locating posts 606 extend. On either side of plateau 604, core plate 602 has raised pads 608 and holes 610. Raised pads 608 are illustratively oval shaped and extend the majority of the way between plateau 604 and edges 612 of core plate 602. Mold 600 also has a cavity plate, not shown, that mates with core plate 602 when mold 600 is closed. The cavity plate may also have raised pads 608 and holes 610.

Raised pads 608 maintain coil 614 in centered spaced relation to a surface 620 of core plate 602 facilitating the flow of the encapsulating material 309 around the radial inner side 622 of coil 614. Holes 610 result in compression tabs or projections 624 being formed in encapsulation 313 on the radial inner side 622 of field coil 304 and, if provided in the cavity plate of mold 600, on the radial outer side 628 of field coil 304. (For continuity, reference number 622 is used to identify the radial inner side of coil 614 and of field coil 304). Raised pads 608 form recesses 626 in the encapsulation 313 on radial inner side 622 of field coil 304 and, if provided in the cavity plate of mold 600, on the radial outer side 628 of field coil 304. In addition to providing spacing between coil 614 and core plate 602, and the cavity plate of the mold 600 if provided on the cavity plate, raised pads 608 can also be used to thin out the walls of the encapsulation 313 that encapsulates coil 614 of field coil 304. Compression tabs 624 provided added areas of compression between field coil 304 and the pole pieces 308 (compression tabs 624 on the radial inner side 622 of field coil 304) and between the field coil 304 and the return path pieces 310 (compression tabs 624 on the radial outer side 628 of field coil 304) when field coil 304 is assembled into stator 300 (FIG. 3). Compression tabs 624 are dimensioned so that they are small compared to the overall area of field coil 304 so that they provided added retention without significantly increasing the assembly interference forces when field coil 304 is assembled with stator core pieces 306 (FIG. 3) to form stator 300 (FIG. 3).

Figure 6A:
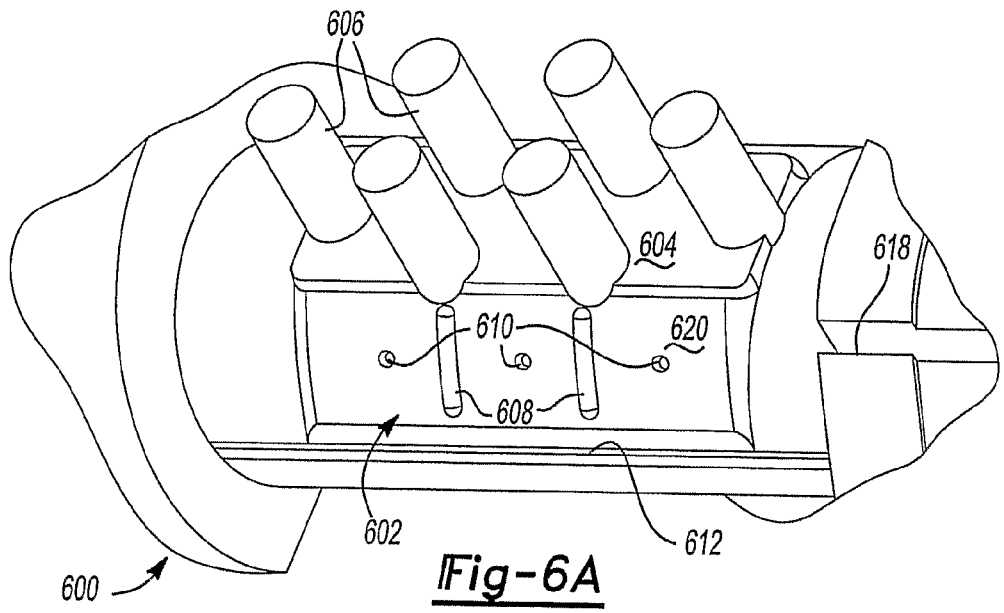
FIGS. 6A-6C are perspective views of a mold used to encapsulate a field coil in accordance with an aspect of the invention, a coil prior to molding and a field coil after molding.
Figure 6B:
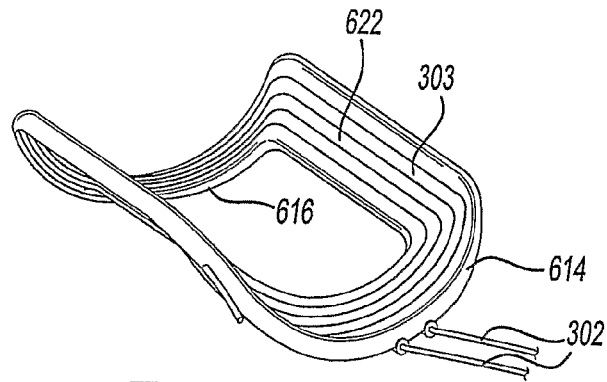
Figure 6C:
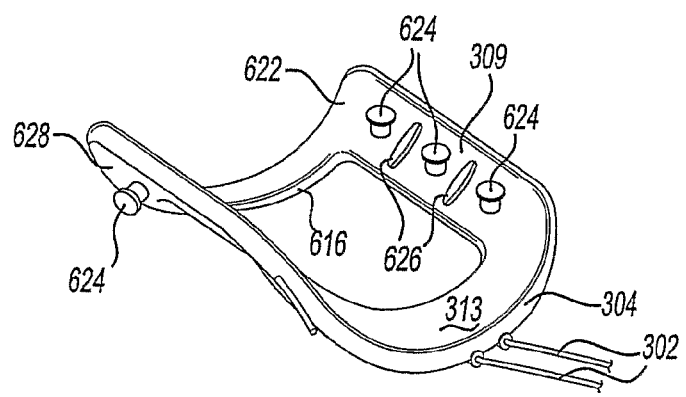

With reference to FIGS. 6A-C, the molding of a field coil, such as field coil 304 (FIGS. 3 and 6C), is described. The magnet wires 303 are wound in a coil 614 (FIG. 6B) having a predetermined shape, which is illustratively a section of a cylinder with a central open rectangular section 616 (FIG. 6B), which is also the final shape of the field coil 304 as can be seen from FIG. 6C. Coil 614 is placed in mold 600 so that plateau 604 extends through central open rectangular section 616. Central open rectangular 616 of coil 614 is placed around locating posts 606 when coil 614 is first placed in mold 600 which assist in properly locating coil 614 on core plate 602 as coil 614 is being placed in mold 600. Lead wires 302 are placed in slots 618 in core plate 602, only one of which is shown in FIG. 6A. The cavity plate of mold 600 is closed over core plate 602 and the encapsulation material 309 (FIG. 3) injected into mold 600, encapsulating coil 614 to form field coil 304 with magnet wires 303 encapsulated in encapsulation 313 made of encapsulation material 309.

Coil 614 of field coil 304 can be insulated by processes other than encapsulation, such as applying a resin coating to them by using the trickle resin process, applying an epoxy coat to them by dipping the formed coil 614 in a tank of epoxy, a powder coat process where heated coil windings cure powdered epoxy on the coil wires, applying an electrically insulating foam to them, or winding insulating tape, such as electrical insulating tape or epoxy tape, around them. In one type of powder coat process, heated coils are placed in a fluidized bed of epoxy. When the coils are insulated by coating, the coating can be applied to the coils before they are assembled in the stator or after. It should also be understood that the coils may be encapsulated or coated to improve abrasion protection and tracking resistance and the coils further insulated to provide insulation between the coils and the stator core pieces, such as with insulated slot liners or winding insulating tape around the encapsulated or coated coils.

FIG. 7 shows a cross section of stator 400 (FIG. 4C) in which the field coils 700 are insulated with a layer of insulating material 702 such as insulating paper, electrical insulating tape, epoxy tape, or electrical insulating foam. Insulating material 702 is wrapped around the coils of field coils 700 in the area abutting the field laminations, such as return path pieces 402 and pole pieces 404.

Such electrical insulating material, other than electrical insulating foam, is not compliant, so clearances must be left between the insulating material 702 and the field laminations, such as return and pole pieces 402, 404. These clearances result in a degree of looseness of field coils 700 in stator 400. To enhance product life and durability, these clearances need to be eliminated, or at least minimized. To do so, a compliant material 708 (FIG. 7B) is placed between the return path pieces 402 and the field coils 700. Compliant material 708 may illustratively be a foam having a suitable temperature rating. Compliant material 708 may also have adhesive on one or both sides to facilitate retaining it in place during assembly of stator 400 and improve retention of field coils 700 relative to return path pieces 402.

If foam is used as electrically insulating material 702 or compliant material 708, it may illustratively be thermally conductive to enhance heat transfer. In this regard, it may contain fillers such as ceramics to increase thermal conductively. Other types of fillers can be used, such as carbon which is cheaper than ceramic, if suitable for the electrical design of the product.

Figure 8:
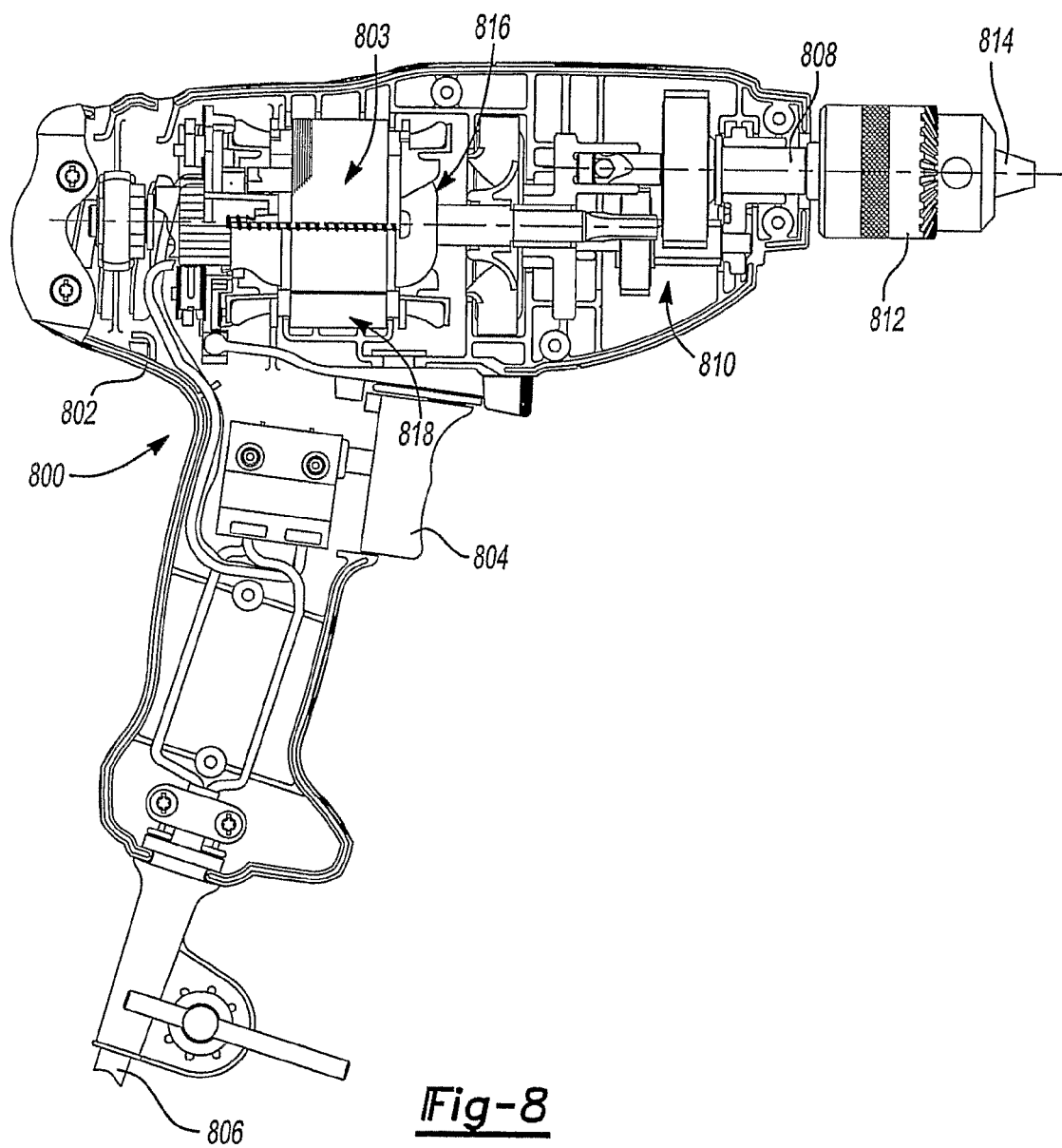
FIG. 8 is a cross-section of a power tool having a stator in accordance with an aspect of the invention.
Figure 9:
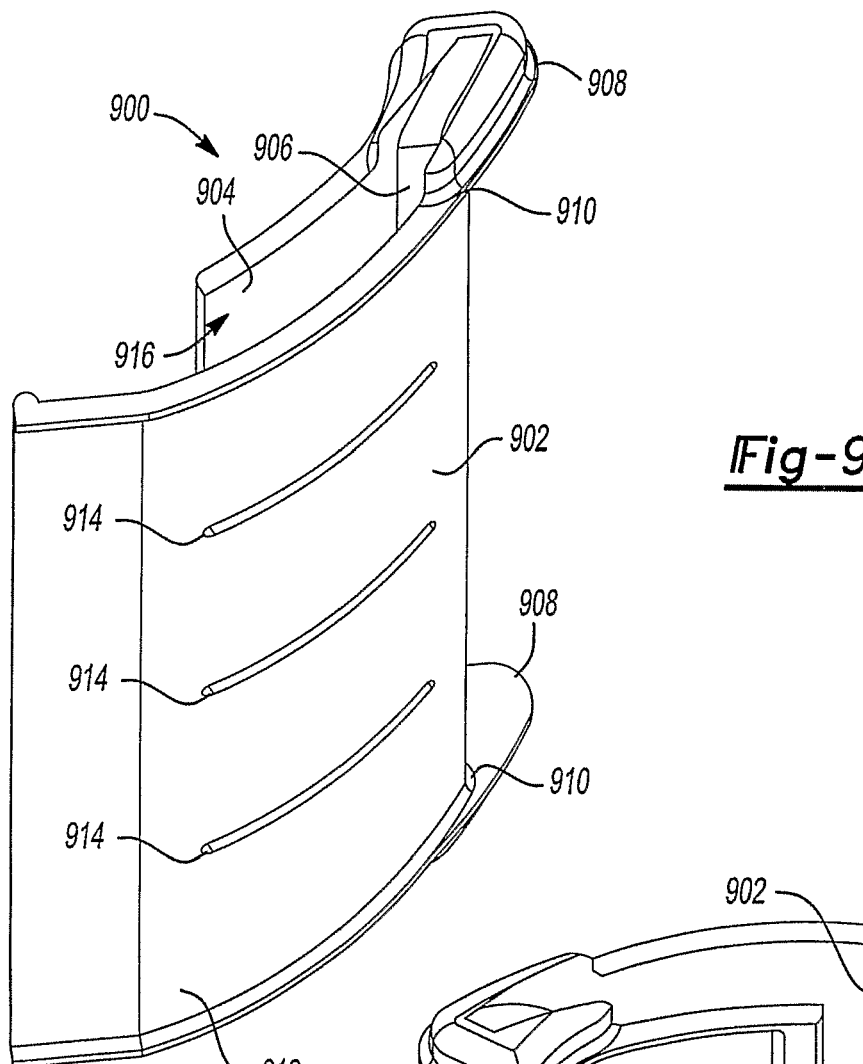
FIG. 9 is a front perspective view of an insulating sleeve for insulating field coils of a stator in accordance with an embodiment of the invention.
Figure 10:
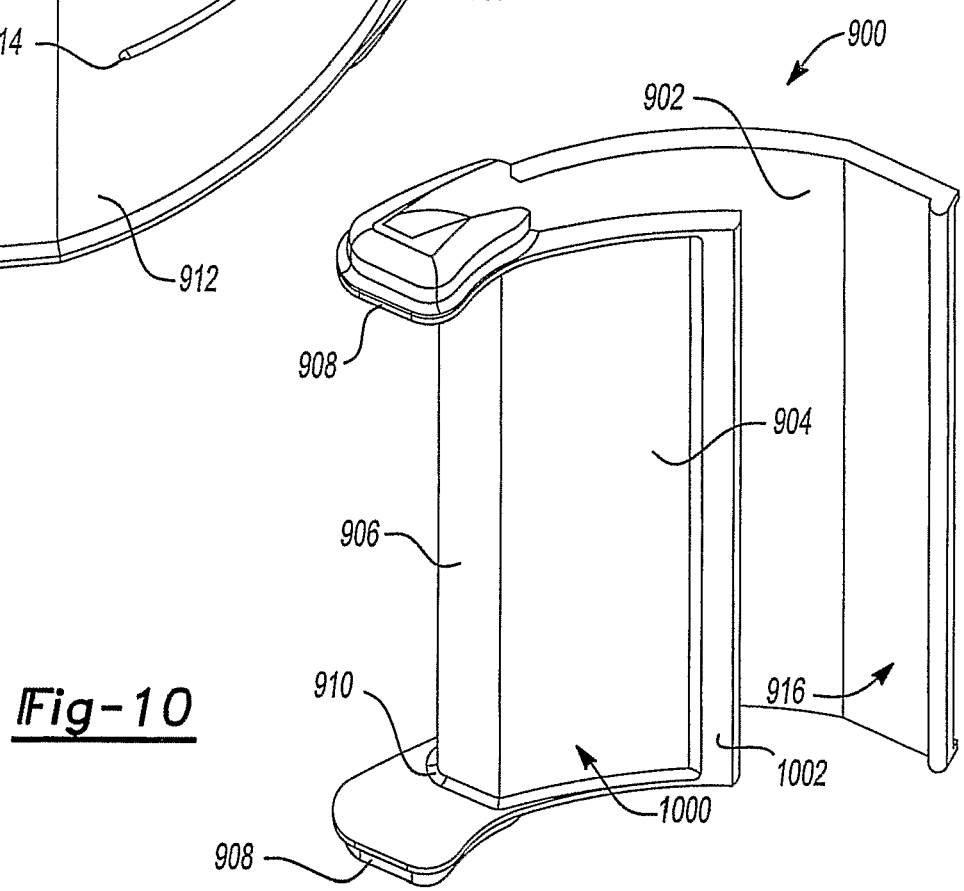
FIG. 10 is a rear perspective view of the insulating sleeve of FIG. 9.

Referring now to FIG. 8, a power tool 800 is shown. Power tool 800 is illustratively a hand-held power tool and is illustrated as a drill, however, any type of power tool may be used in accordance with the present invention. The power tool 800 includes a housing 802 which surrounds a motor 803. An activation member 804 is coupled with the motor and a power source 806, illustratively AC. The motor 803 is coupled with an output 808 via a drivetrain 810. Output 808 includes a chuck 812 having jaws 814 to retain a tool such as a drill bit (not shown). The motor 803 includes an armature 816 and a stator 818 made in accordance with this invention, such as stator 300 or 400 (FIGS. 3 and 4).

Figure 11:
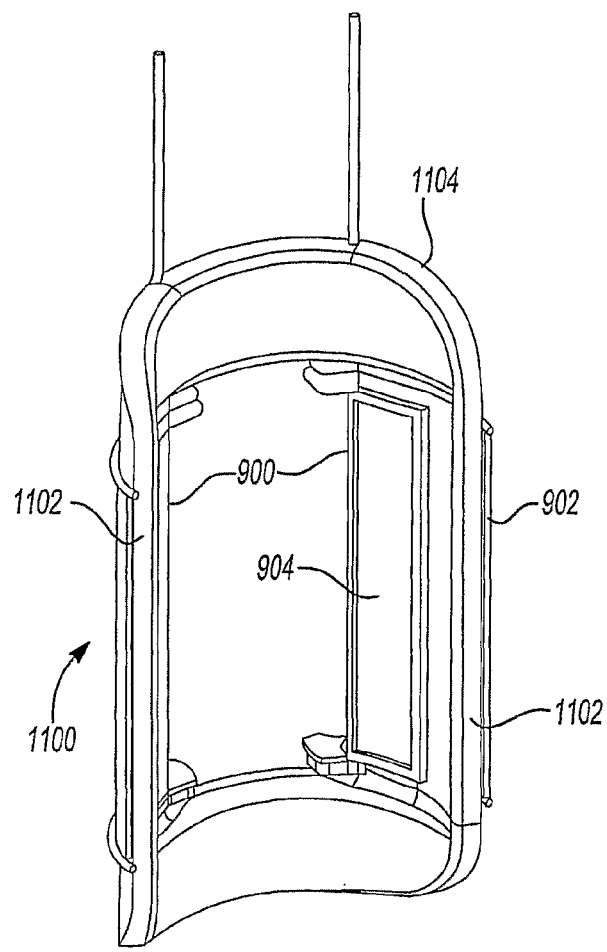
FIG. 11 is a perspective view of a field coil/insulating sleeve assembly using the insulating sleeves of FIGS. 9 and 10.
Figure 12:
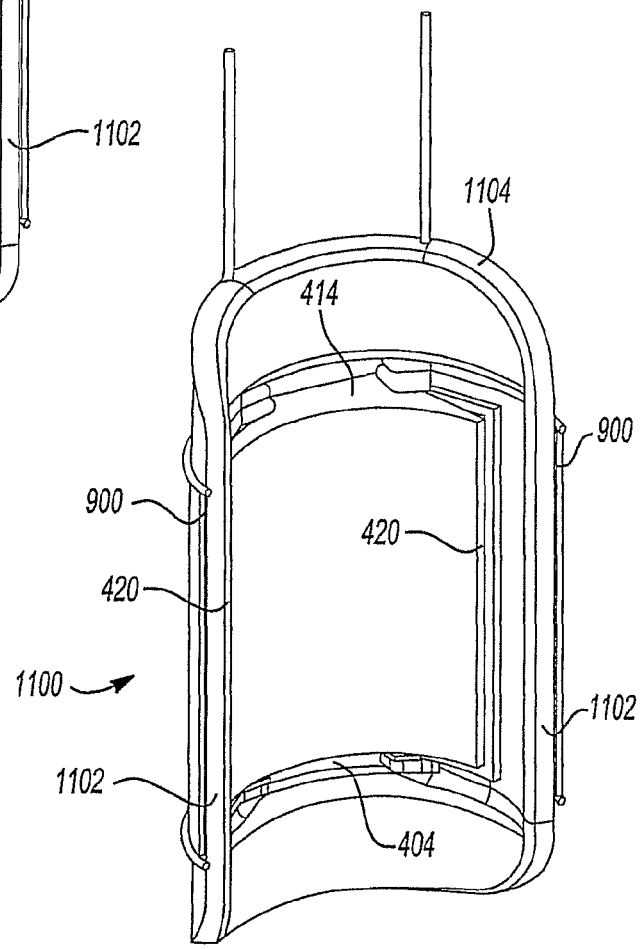
FIG. 12 is a perspective view of the field coil/insulating sleeve assembly of FIG. 11 assembled on a pole piece.

FIGS. 9-12 show an insulating sleeve 900 that can be used as the insulating slot liner 322 (FIG. 3A) and in lieu of encapsulating the field coils, such as field coils 1104 (FIG. 11). For convenience, insulating sleeve 900 will be described with reference to the stator 400 of FIG. 4. Insulating sleeve 900 may illustratively be made of compliant material, such as liquid silicon rubber, and may illustratively be molded. Insulating sleeve 900 includes an outer section 902, inner section 904 and a bight section 906 bridging inner and outer sections 904, 902 at one edge thereof. Locating or centering tabs 908 extend from opposed ends 910 of bight section 906. An outer surface 912 of outer section 902 has laterally extending outwardly projecting compression ribs 914 formed thereon. A pocket 1000 (FIG. 10) may be formed in an outer surface 1002 of inner section 904 for receiving one of the pole tips 420 of pole piece 404 (FIG. 4). Outer and inner sections 902, 904 and bight section 906 of insulating sleeve 900 define a slot 916 in which one of sides 1102 of field coil 1104 (FIG. 11) is received.

The use of insulating sleeve 900 is now described. In assembling the stator 400, two insulating sleeves 900 are placed on field coil 1104 with opposite sides 1102 (FIG. 11) of the field coil 1104 received in the slots 916 of the respective insulating sleeves 900 to form field coil/sleeve assembly 1100. The width of the outer section 902 of the insulating sleeve 900 may illustratively be the same or preferably slightly greater than the width of the side 1102 of the field coil 1104 that is received in the slot 916 of the insulating sleeve 900 to insulate the field coil 1104 from an inner surface of the return path piece 402 that is adjacent the side 1102 of the field coil 1104 when the field coil 1104 is assembled in stator 400. The width of the inner section 904 of the insulating sleeve 900 may illustratively be the same or preferably slightly greater than the width of the section of the pole tip 420 of pole piece 404 that is adjacent the side of the field coil 1104 when the field coil 1104 is assembled in stator 400 to insulate the field coil from the surface of the pole tip 420 adjacent the side of the field coil 1104.

A field coil/sleeve assembly 1100 is then placed over the neck 414 of each of the pole pieces 404 and the pole pieces 404 mated with the return path pieces 402. The pole tips 420 of each pole piece 404 are received in the pockets 1000 (FIG. 10) of the respective insulating sleeves 900 disposed over the opposite sides 1102 of that field coil 1104 to aid in retaining the field coil/sleeve assembly 1100 in place. Centering tabs 908 of the insulating sleeves 900 center the pole piece 404 and the field coil/sleeve assembly 1100 with respect to each other. Compression ribs 914 compress against respective inner surfaces 434 (FIG. 4B) of respective return path pieces 402 and aid in securing the field coil/sleeve assembly in place in stator 400 so that the field coil/sleeve assembly 1000 will not vibrate loose during operation of the motor in which it is used, such as in power tool 800.

Figure 18:
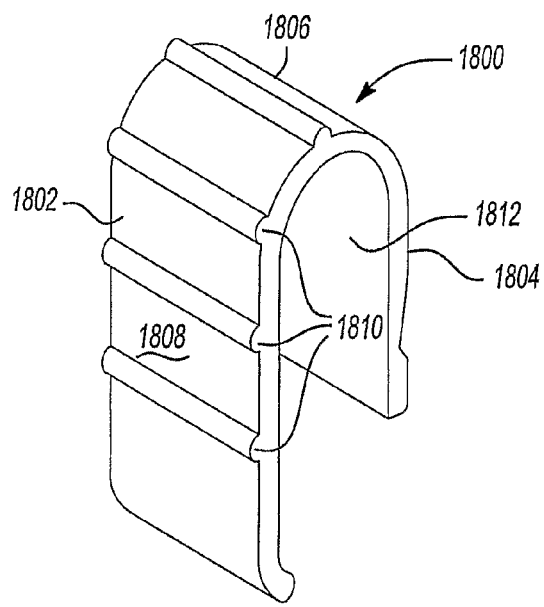
FIG. 18 is a perspective view of a variation of the insulating sleeve of FIG. 9.

Turning to FIG. 18, an insulating sleeve 1800 that is a variation of insulating sleeve 900 is shown. Insulating sleeve 1800 is also made of complaint material, such as silicon rubber, but is extruded instead of molded. Insulating sleeve 1800 includes an outer section 1802, an inner section 1804 and a bight section 1806 bridging inner and outer sections 1804, 1802 at one edge thereof. An outer surface 1808 of outer section 1802 has outwardly projecting compression ribs 1810 formed thereon that extend across outer section 1802. Outer and inner sections 1802, 1804 and bight section 1806 define a slot 1812 in which one side of a field coil, such as field coil 1104 (FIG. 11) is received. Compression ribs 1810 allow tuning adjustments in the tool used to extrude insulating sleeve 1800 so that the retention force on the field coil, such as field coil 1104, when it is assembled as part of a stator such as stator 400 can be optimized.

Figure 5E:
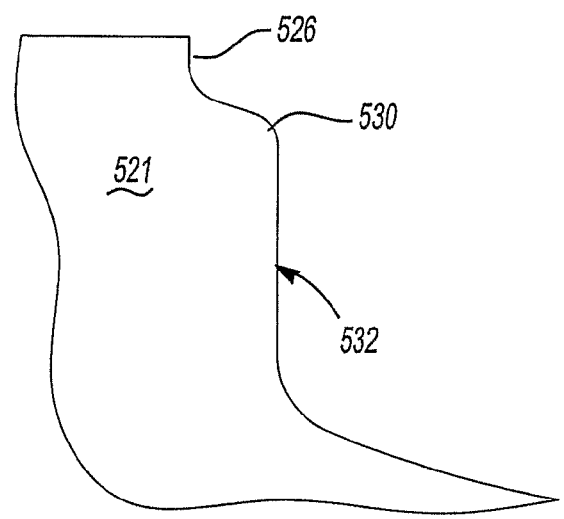
Figure 5F:
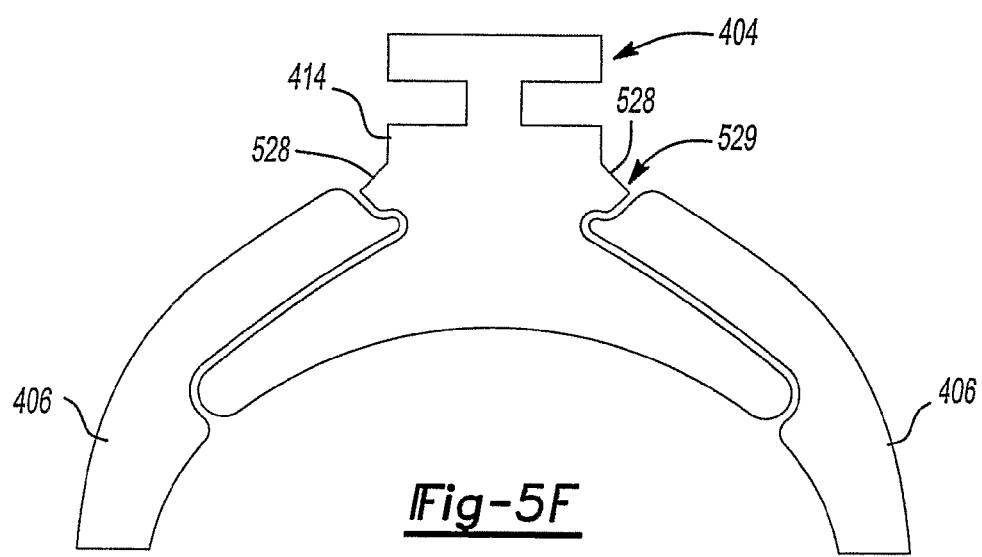
FIG. 5F is a side section view of a pole piece and field coil with portions of the pole piece staked over the field coil.

With reference to FIG. 5E, edges 526 of radially outer section 521 of pole tip section 522 are recessed and have a radius at 530. However, edges 526 are not formed to include lips 528 (FIG. 5D) so that a radially extending outer surface 532 of radially outer section 521 of pole tip portion 522 presents a smooth wall free of detents, lips or the like. This improves assembly when the field coils are insulated with compliant insulating sleeve 900 and insulating slots liners made of paper such as embodiments of insulating slot liners 322 (FIG. 3A), 1300 and 1600 (described below.) The radius 530 and the smooth wall presented by surface 532 helps prevent displacing the insulating sleeve 900 and insulating slot liners 1300, 1600 from their proper position around the field coils.

As mentioned, insulating sleeve 900 may illustratively be made of compliant material, such as liquid silicon rubber, and may illustratively be used in lieu of encapsulating the field coils. This provides the benefit of not having to insert mold the field coils with an encapsulant. Insulating sleeves 900 can be molded separately at a rate that applicants expect will be much faster than the rate at which the field coils can be wound and the mold(s) used to mold the insulating sleeves will likely be able to have more cavities than the mold(s) used to insert mold the field coils.

FIGS. 13-15 show an insulating slot liner 1300 in accordance with an embodiment of the invention that can be used as insulating slot liner 322 (FIG. 3A) and in lieu of encapsulating the field coils. Insulating slot liner 1300 includes a substrate 1302 made of insulative material, such as insulating paper, insulating plastic film, or the like having an outer section 1301 and an inner section 1303. Illustrative materials of which substrate 1302 can be made include various grades of Nomex® paper or tape, polyester/glass fiber, polyester/rag, Nomex®/polyester, or polyester/Dacron® laminates. An inner adhesive strip 1304 is disposed on an inner surface 1306 of outer section 1301 of substrate 1302 and an outer adhesive strip 1308 is disposed on an outer surface 1310 of inner section 1303 of substrate 1302. An outer surface 1404 (FIG. 14) of outer section 1301 may also have an adhesive strip (not shown) disposed thereon as may an inner surface 1406 of inner section 1303. Inner and outer adhesive strips 1304, 1308 may illustratively include non-stick overhanging cover strips 1400 (FIG. 14) that can be easily removed from inner and outer adhesive strips 1304, 1308 during assembly. One or both of opposed upper and lower edges 1312 of substrate 1302 may illustratively be folded over cuffed edges.

Insulating slot liner 1300 may illustratively be "C" or "U" shaped and may illustratively be preformed so that it fits the contours of the field coils, such as field coils 614, and radially outer surfaces 1500 (FIG. 15) of pole tips 420 of pole pieces 404 of stator 400 that abut field coils 614 and inner surfaces 1502 of return path pieces 402. This aids in adhesive retention such as between inner adhesive strip 1304 and field coil 614 and/or between outer adhesive strips 1308 and the surfaces 1500 of pole tips 420 of pole pieces 404. This also aids in assembly. Insulating slot liner 1300 may illustratively be sized so that a distal edge 1505 (FIG. 15) of outer section 1301 extends beyond a distal edge 1506 of field coil 614 and a distal edge 1508 of inner section 1303 extends beyond an outer edge 1510 of pole tip 420. In a 59 mm. O.D. stator, this distance is illustratively a minimum of 2 mm. Cuffed edge(s) 1312 of substrate 1302 extend over axial edge(s) 436 (FIG. 4B) of return path piece 402 and axial edge(s) 438 (FIG. 4A) of pole piece 404 to locate insulating slot liner 1300 on return path piece 402 and pole piece 404 and, when both opposed edges 1312 of substrate 1302 are cuffed, to capture insulating slot liner 1300 on return path piece 402 and pole piece 404.

The use of insulating slot liners 1300 is now described. In assembling the stator 400, cover strips 1400 are removed from the inner adhesive strips 1304 of two insulating slot liners 1300 which are then placed on field coil 614 with the opposites sides of the field coil 614 received in respective ones of the insulating slot liners 1300. If an adhesive strip is provided on inner surface 1406 of inner section 1303, its cover strip is removed before placing the insulating slot liner 1300 over the side of field coil 614. Inner adhesive strip 1304 secures the insulating slot liner 1300 to the side of the field coil 614 over which the insulating slot liner 1300 was placed. The cover strips 1400 are then removed from outer adhesive strips 1308 of the insulating slot liners 1300 and field coil/insulating slot liner assembly 1514 (FIG. 15) placed over the neck 414 of a pole piece 404, bringing the outer adhesive strips 1308 of the insulating slot liner 1300 into contact with the surfaces 1500 of the pole tips 420 of the pole piece 404 so that the adhesive on the outer adhesive strips 1308 contacts the surfaces 1504 of the pole tips 420. The return path pieces 402 are then mated with the pole pieces 404. If an adhesive strip is provided on the outer surface 1404 of outer section 1301 of insulating slot liner 1300, its cover strip is removed before the return path piece 402 that will abut that insulating slot liner 1300 is mated to the pole piece 404. It should be understood that while only one insulating slot liner 1300 is shown in FIG. 15, all of field coils 614 would be insulated with insulating slot liners 1300, illustratively, two insulating slot liners 1300 for each field coil 614.

Inner adhesive strip 1304 may illustratively be a pliable adhesive strip, such as a foam or gel strip ranging from 0.001" to 0.250" in thickness, to take up clearances and fill into component contours of field coil 614 to provide a robust retention force. Outer adhesive strip 1308 may also be a pliable adhesive strip.

Outer adhesive strip 1308 may illustratively be sized so that there is a gap between its edges and the edges of substrate 1302, shown representatively at 1316. That is, outer adhesive strip 1308 is smaller than the outer surface 1310 on which it is disposed. By having a gap between the edges of substrate 1302 and outer adhesive strip 1308, that is, sizing outer adhesive strip 1308 so that it is smaller than the outer surface 1310 on which it is disposed, the adhesive on outer adhesive strip is completely covered by inner surface 1502 of return path piece 402 when insulating slot liner 1300 is assembled in stator 400. This minimizes or eliminates any dust or chips contacting the adhesive on outer adhesive strip 1308 and being retained thereon. Similarly, inner adhesive strip 1304 may illustratively be sized so that it is smaller than the inner surface 1306 of substrate 1302 on which it is disposed. It should be understood that the insulating slot liner 1300 could have multiple inner and outer adhesive strips 1304, 1308.

The inner and outer adhesive strips 1304, 1308 of the insulating slot liners 1300 serve three purposes. They retain the field coils 614 to the return path pieces 402 and pole pieces 404 and prevent slippage between field coils 614 and the return path pieces 402 and pole pieces 404. They act as a secondary support to hold together the windings of field coil 614. They also act as a secondary support to hold together the return path piece 402 and the pole piece 404.

The thickness of the substrate 1302 of insulating slot liner 1300 may illustratively be optimized to take up clearances thus keeping the assembly of the field coils 614 and the return path and pole pieces 402, 404 tight and keeping pressure on inner and outer adhesive strips 1304, 1308 as they contact field coils 614 and the inner surfaces 1502 of return path pieces 402, respectively. In a 59 mm O.D. stator 400, the optimum thickness of substrate 1302 is in the range of 0.002" to 0.030". The distal edge 1505 of outer section 1301 may also be folded over as shown at 1402 in FIG. 14. Doing so helps take up clearances, increases the interference in a localized area for a tight fit in that localized area. It may also allow a thinner, better conforming, lower cost paper to be used for substrate 1302.

Certain materials, such as some types of insulated paper, that can be used for substrate 1302, have a smooth surface on one side and a rough surface on the other side. For these materials, insulating slot liner 1300 may illustratively be formed so that the smooth surface is the outer surface of substrate 1302 that contacts the surfaces 1500 of pole tips 420 and inner surfaces 1502 of return path pieces 402 to facilitate assembly.

As shown in FIG. 15, field coil 614 could in an alternative embodiment be insulated with a full wrap of insulated material, such as insulated paper, as shown in phantom at 1512. This reduces the likelihood of the insulated paper curling up into the armature of the motor in which stator 400 is used and prevents slippage of the insulated paper during assembly.

FIGS. 16A and 16B show an insulating slot liner 1600 which is a variation of insulating slot liner 1300. Like elements will be identified with the same reference numbers and only the differences will be described. Insulating slot liner 1600 includes compliant material 1602 disposed on inner and outer surfaces 1406, 1310 of inner section 1303 and inner and outer surfaces 1306, 1404 of outer section 1301 of substrate 1302. The compliant material 1602 provide an interference between the substrate 1302 of the insulating slot liner 1600, the field coil, such as field coil 614 (FIG. 15), and the return path pieces 402 and pole pieces 404. It should be understood that compliant material 1602 can be disposed on one as opposed to both of the inner and outer surfaces 1306, 1404 of outer section 1301 of substrate 1302 and on one as opposed to both of the inner and outer surfaces 1406, 1310 of inner section 1303 of substrate 1302. It should also be understood that compliant material 1602 can be strips of complaint material, beads or other shapes. It should further be understood that complaint material 1602 can be any suitable complaint material, such as compliant polymers such as silicon, resins, foams or epoxies.

Figure 19:
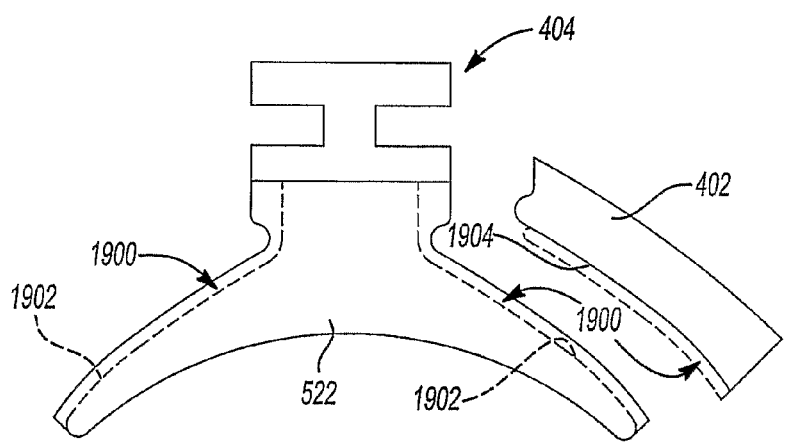
FIG. 19 is a side section view of stator core pieces having a coating of insulation.

Alternatively or in addition to encapsulating the field coils and or using insulating slot liners, the stator core pieces 306 or appropriate portions of the stator core pieces can be encapsulated or covered with an encapsulating or coating material, such as thermoplastics and thermosets, which may illustratively be thermally conductive or not. By way of example and not of limitation, the stator core pieces 306 (or appropriate portions of them) can be covered with an epoxy coating that is either sprayed on or applied using an electrostatic coating process. With reference to FIG. 19, a layer 1900 of insulation is applied to surfaces 1902 of pole tip portion 522 of pole piece 404 and to radially inner facing surfaces 1904 of return path pieces 402 (only one of which is shown in FIG. 19).

Figure 20:
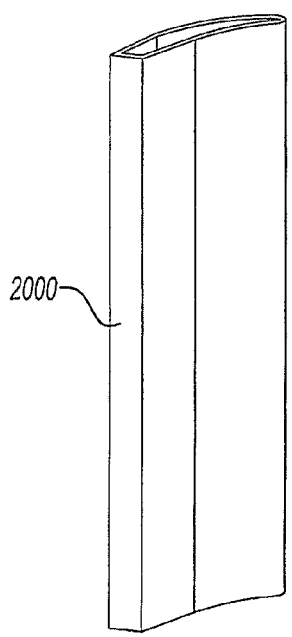
FIG. 20 is an isometric view of an insulating slot liner made of a layer of insulation material with a B-stage thermoset adhesive or a thermoplastic adhesive thereon.
Figure 21:
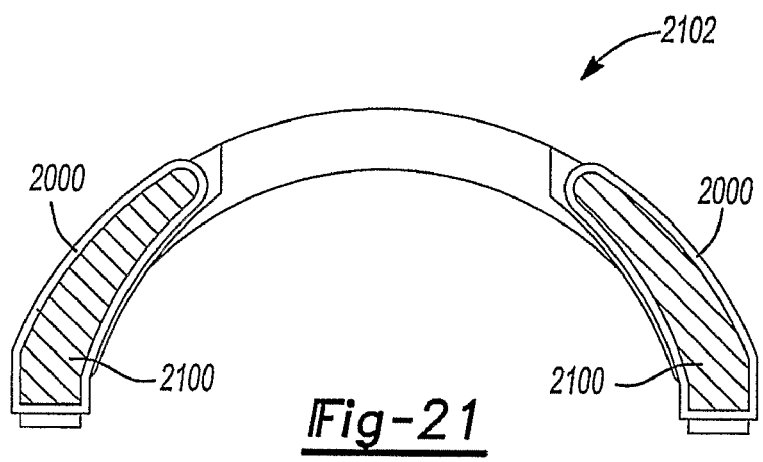
FIG. 21 is a side view of a field coil insulated with the insulating slot liner of FIG. 20.

Referring to FIGS. 20 and 21, an insulating slot liner 2000 that is a variation of insulating slot liner 1300 (FIG. 13) is shown. Insulating slot liner 2000 is made of a layer of insulation material, such as one of the above referenced insulation papers, having both sides or surfaces coated with a thin layer of a B-stage thermosetting adhesive, such as VonRollIsola 6001 (phenolic) or 6351 (epoxy). A B-stage thermosetting adhesive is one that is dry to the touch and not tacky and is in a state to be cured by the application of heat. An insulating slot liner 2000 is wrapped around each portion of a field coil that is disposed between a pole piece and a return path piece mated to that pole piece. Insulating slot liner 2000 is illustratively formed with creases to contour around the field coil. Additionally, for lower temperature applications, a thermoplastic adhesive could be used, such as VonRollIsola HS2400. Moreover, pre-laminated films with adhesives could also be used, such as 3M bonding film 583 or 588 (heat or solvent cure), or 3M ENPE-365 (UV light cure). The film containing the resin is itself adhered to the insulation paper used for the slot liner.

In assembly, insulating slot liner 2000 is wrapped around the appropriate portion of the field coil, such as field coil 2100 (FIG. 21), and secured with a thin tape, such as 0.025 mm thick acrylic adhesive tape, to form insulated field coil 2102. The insulated field coil 2102 is then placed over the neck 414 of a pole piece 404 (FIG. 4). Preferably, there will be enough pressure between the insulating slot liner 2000 and pole piece 404 to hold the two together during assembly of stator 400. If not, a temporary adhesive may be used, such as thin double-sided taped, one or two part adhesives, and UV light cure adhesives.

The thickness of the material, such as insulating paper, used for insulating slot liner 2000 is chosen so that there is a slight pressure between field coil 2100, the insulating slot liner 2000, and the return path pieces 402 and the pole pieces 404 after final assembly. This will hold the field coil 2100 in the proper position until the B-stage adhesive is activated and cured. If there is not sufficient pressure, a temporary adhesive can be used until the B-stage adhesive is cured. The B-stage adhesive on both sides of the material used for insulating slot liner 2000 adheres to both the field coil 2100 and the return path pieces 402 and the pole pieces 404, and secures them to each other. This facilitates the motor in which the stator 400 is used withstanding heavy vibrations that are seen in some motor/power tool applications. The B-stage adhesive also acts to bond the individual laminations of the return path pieces 402 and pole pieces 404 together.

Figure 22:
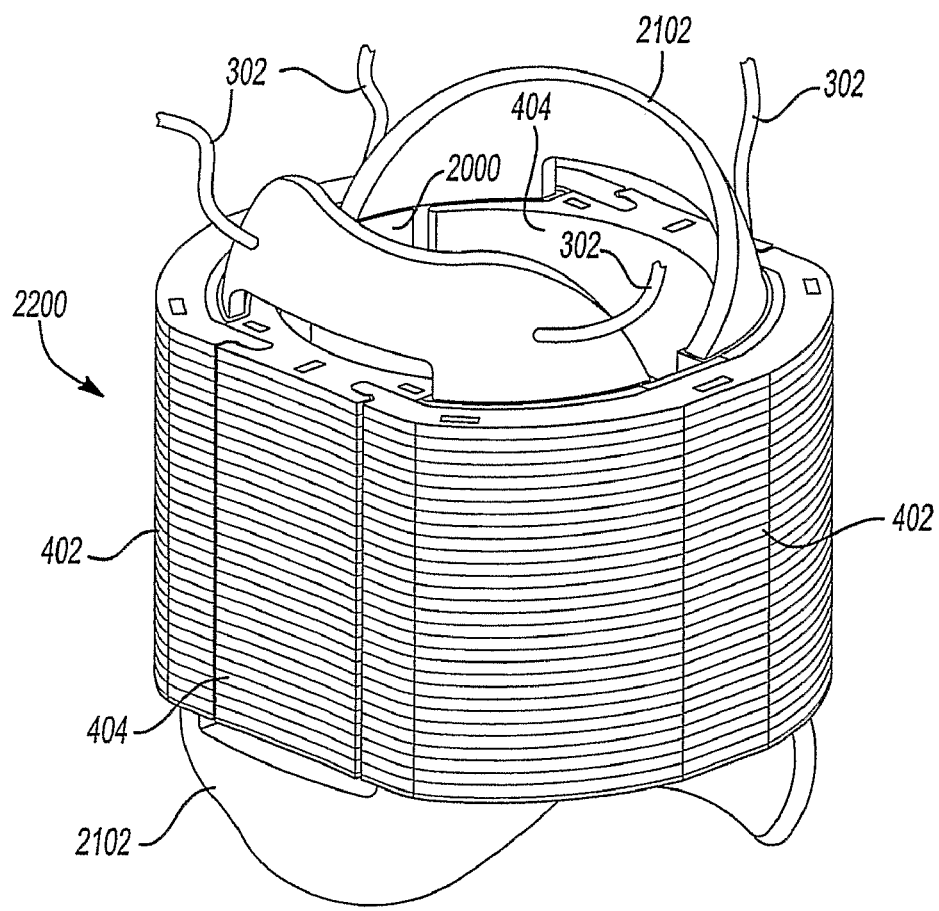
FIG. 22 is a perspective view of a field having the field coil of FIG. 21.

FIG. 22 shows a field (stator) 2200 made in accordance with this invention utilizing the insulated field coils 2102. Elements in common with those described above with reference to previously discussed figures are identified with the same reference numerals used for those elements in those figures. In the illustrative embodiment of FIG. 22, after field coils 2102 are placed on the necks of pole pieces 404 and pole pieces 404 mated with return path pieces 402, field coils 2102 are coated with epoxy using one of the processes described above. Illustratively, field coils 2102 are coated with epoxy by placing the field 2200 in a fluidized bed of epoxy and heating field coils 2102, such as by running electrical current through them.

As discussed above with reference to FIG. 8, a motor, such as motor 803, having a stator 818 made as described above, such as with reference to FIGS. 2, 3, 4 and 22 (hereafter referred to as a "multi-piece stator") can advantageously be used in power tools, such as power tool 800. Motor 803 illustratively has an armature having an OD that is at least 0.625 times the OD of the stator and may also have field windings that extend beyond the pole tips of the pole pieces, as described above. The field windings may also be wound with larger gauge wire than a comparably sized prior art motor. Such a motor provides higher power compared to a prior art motor for a given maximum no-load speed and motor volume. Alternatively it provides the same power at a lower maximum no-load speed and/or lower motor volume compared to a prior art motor. Thus, a hand-held power tool in accordance with aspects of the invention having a motor using the multi-piece stator can have higher power with the same motor volume and weight as the prior art power tool; have the same power but weigh less and have a smaller motor volume (allowing the power tool to be smaller); or have the same power and motor volume but run at a lower speed. Running at a lower speed can improve reliability and reduce overall vibration, particularly in those power tools having mechanical clutches and gearing. Motor 803 may preferably be a universal series motor and can be powered by AC or DC.

Motor volume, as used herein, is determined by frame size and stack length. Thus, power tool having a motor in accordance with the aspects of the invention just described can a motor having the same power as a prior art motor can have a smaller frame size motor and/or a motor having a shorter stack length. Alternatively, it can have a motor with the same frame size and stack length as a prior art motor but provide higher power. It can also have a motor that has a smaller volume (frame size and/or stack length) yet provide higher power than the prior art motor.

In hand-held power tools that are drills or hammer drills, important ergonomic criteria include motor power, volume (dictated primarily by the length of the stack of the motor's stator) and weight. With reference to power tool 800 shown in FIG. 8, a drill or hammer drill having motor 803 can have a given frame size motor (OD of the stator) with a shorter stack and have the same or even somewhat higher power compared a drill or hammer drill having the same frame size prior art motor. In this regard, motor 803 has a multi-piece stator of the type described above and an armature having an OD that is at least 0.625 the OD of the stator. It may also have field windings that extend beyond the tips of the pole pieces. The field windings may also be wound with larger gauge wire than a comparably sized prior art motor. Motor 803 may be a universal series motor.

Figure 34:
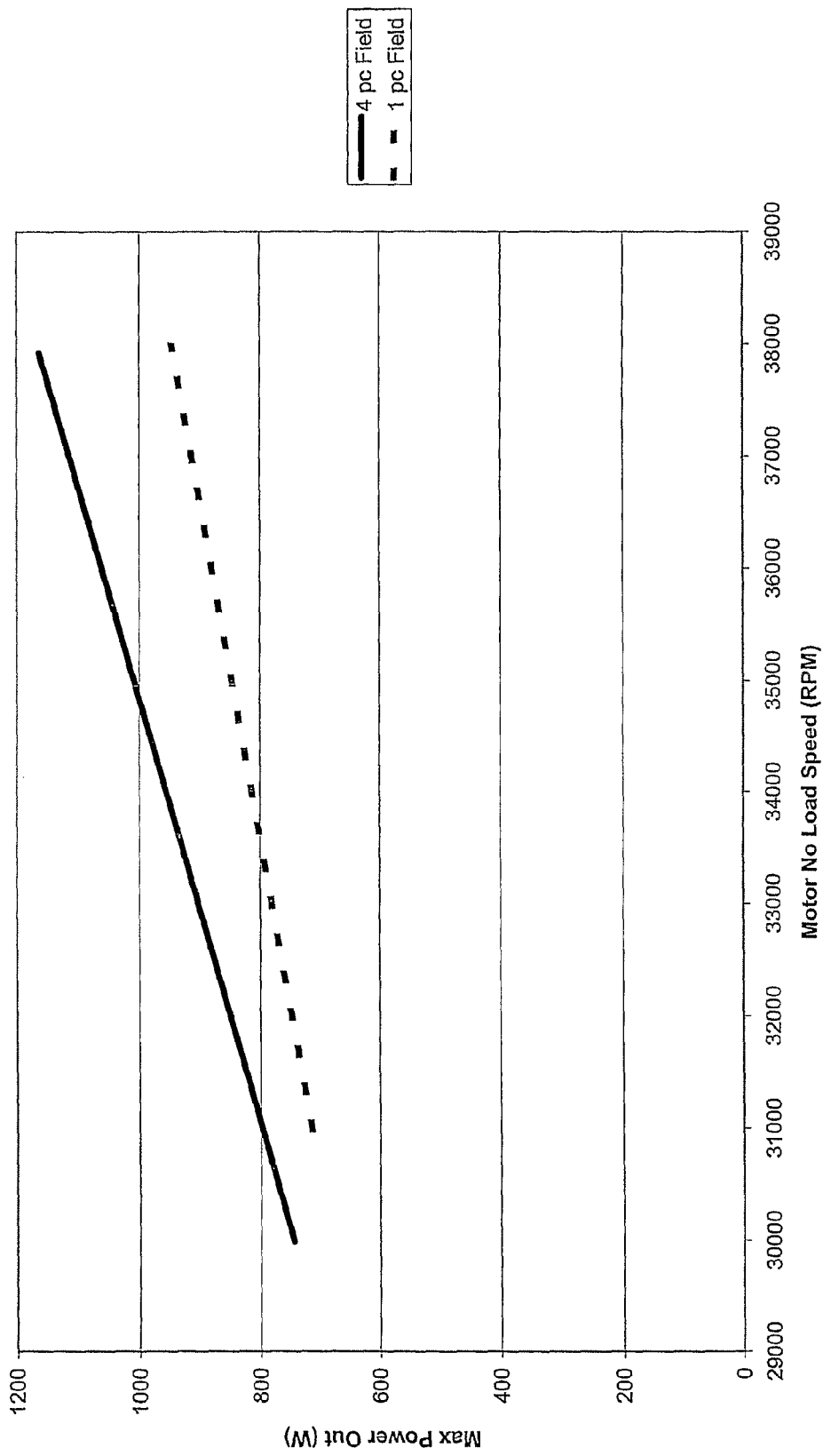
FIG. 34 is a graph comparing the maximum watts out of a prior art motor to a motor in accordance with the invention at various maximum no-load speeds.
Figure 35:
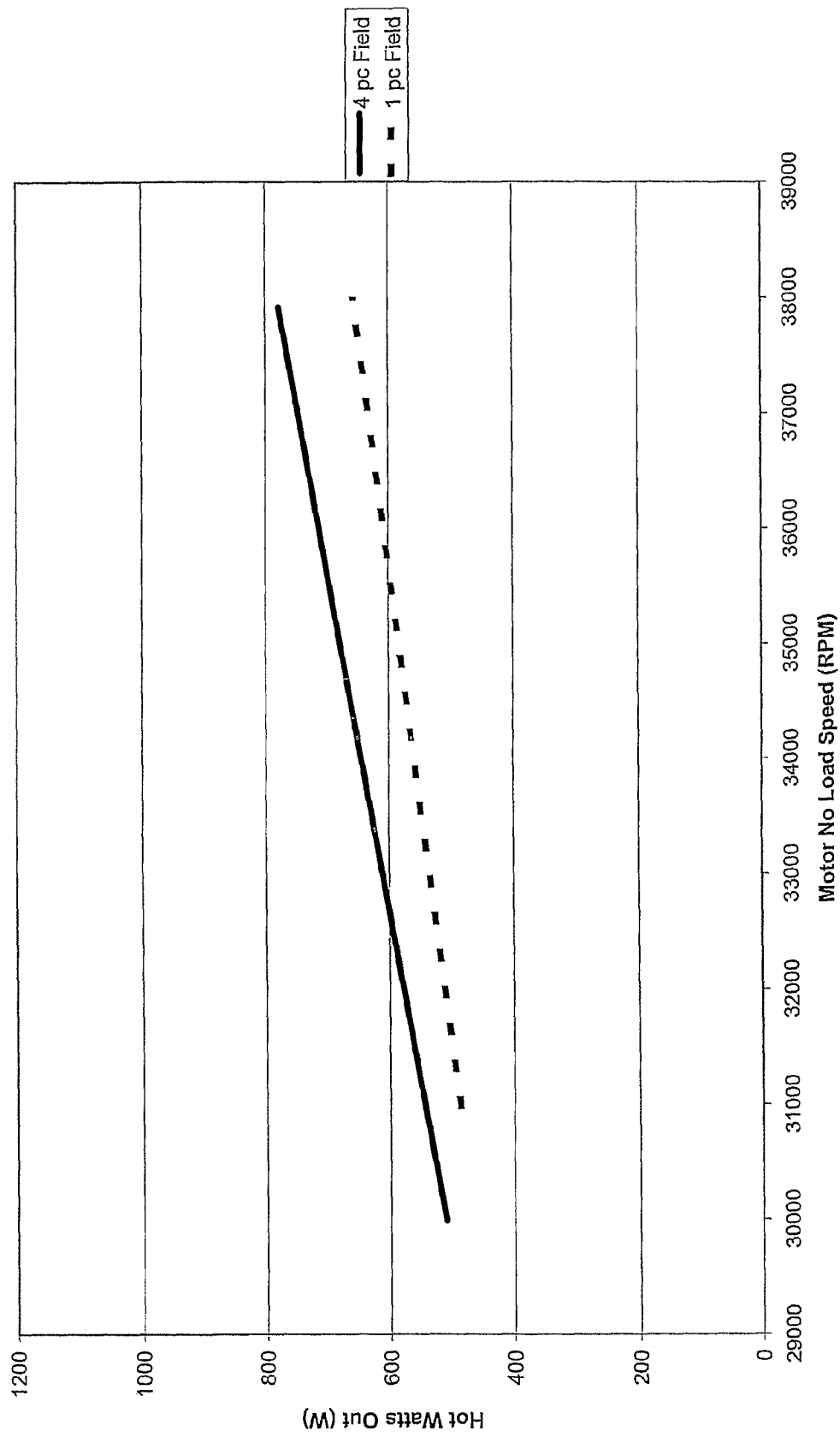
FIG. 35 is a graph comparing the maximum hot watts out of a prior art motor to a motor in accordance with the invention at various maximum no-load speeds
Figure 36:
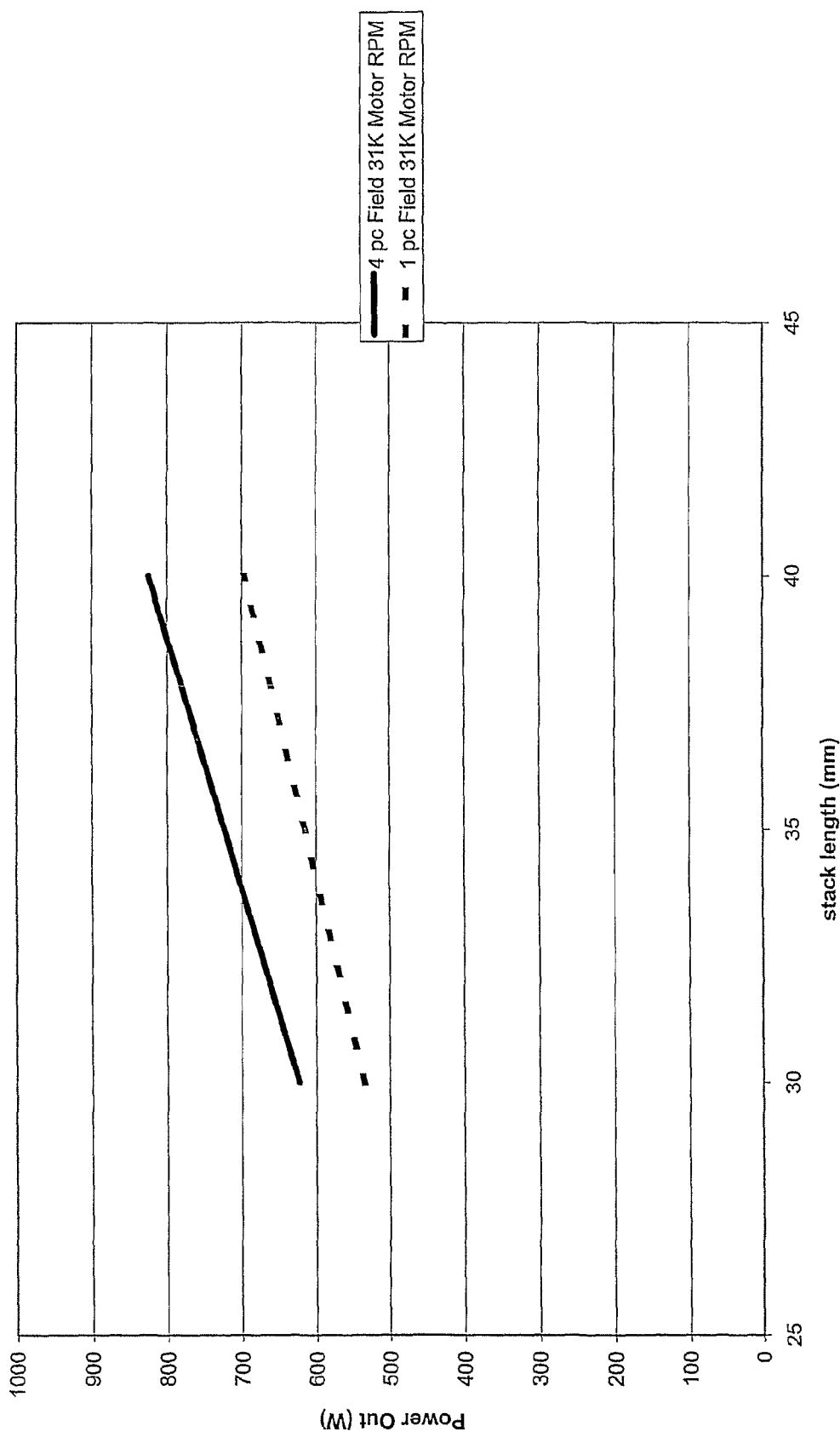
FIG. 36 is a graph comparing power output of a prior art motor to a motor in accordance with the invention at various stack lengths where the motors are wound to run at a maximum no-load speed of 31,000 rpm.
Figure 38:
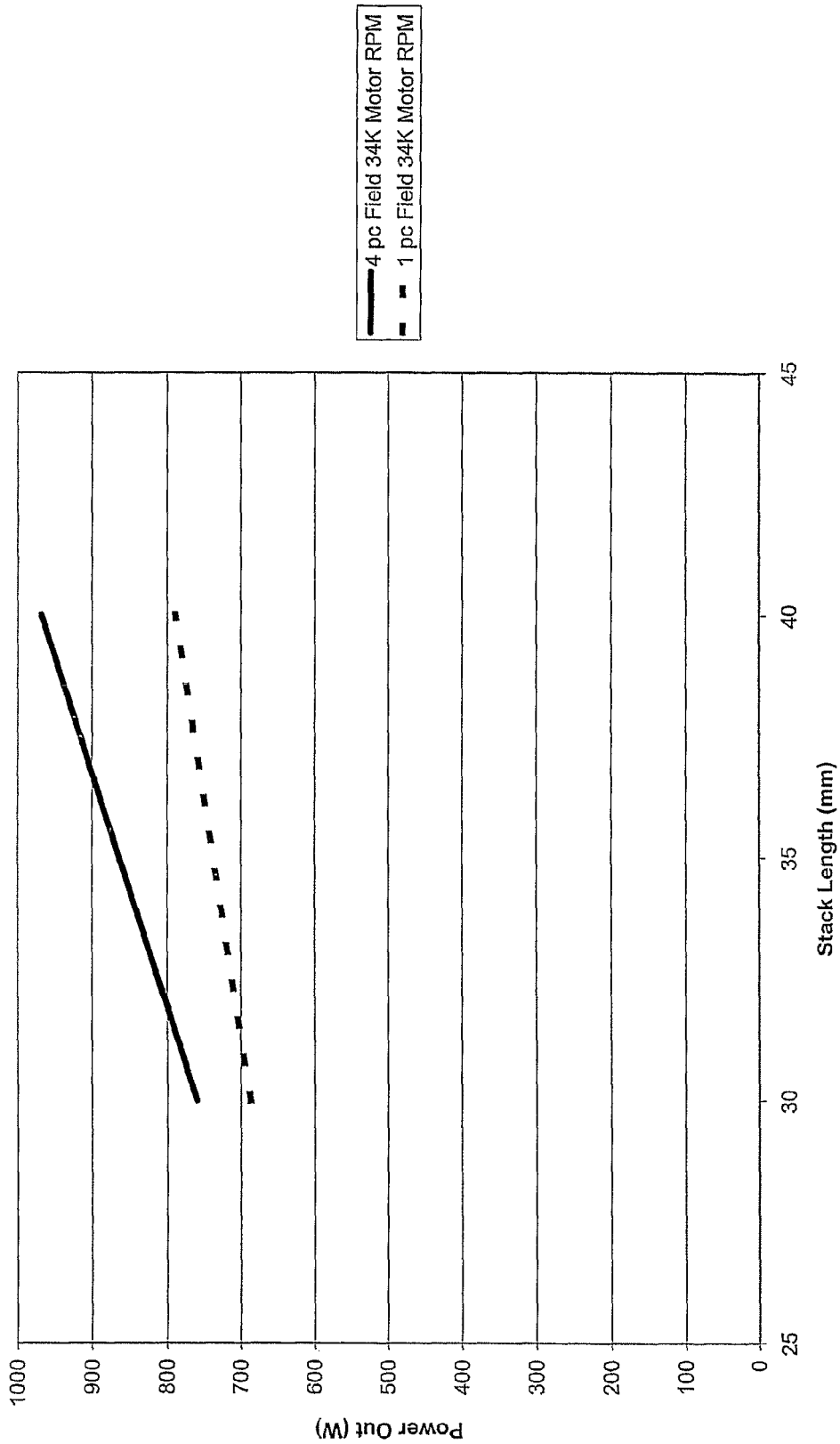
FIG. 38 is a graph comparing power output of a prior art motor to a motor in accordance with the invention at various stack lengths where the motors are wound to run at a maximum no-load speed of 34,000 rpm.

In an example, the stack length of a 59 mm OD frame size motor can be reduced approximately 12.5% from 40 mm to 35 mm while maintaining the same frame size and speed. In this embodiment, motor 803 having a 59 mm OD frame size, a stack length of 35 mm and wound to run at a no-load speed of 31,000 rpm has a maximum watts out of about 700 watts whereas the prior art motor has a stack length of 40 mm to provide 700 maximum watts out. In an embodiment, power tool 800 as a drill or hammer/drill thus has its housing 802 surrounding motor 803 shortened by a comparable amount, that is, 5 mm. In an embodiment, such a drill is a ½" variable speed reversing drill. Also, a motor 803 having a given frame size, stack length and speed can have higher output power, 30% and even up to 50%, compared to a comparable size prior art motor running at the same speed. For example, motor 813 having a 59 mm OD frame size, a 40 mm stack length, and wound to run at a no-load speed of 31,000 rpm has about 800 maximum watts out compared to 700 maximum watts out of a comparably sized prior art motor. FIG. 34 is chart showing the power increase of a motor in accordance with the invention having a multi-piece stator with a 59 mm OD frame size motor and a 40 mm stack length at various maximum no-load speeds compared to a prior art motor having the same frame size and stack length at the same maximum no-load speeds. The motor designated "SQ59" is the prior art motor and the motor designated "G59" is the motor in accordance with the invention. FIG. 35 compares the same two motors, but for maximum hot watts out. Maximum hot watts out, as used herein, is the maximum watts out at thermal equilibrium. FIG. 36 compares the same two motors but wound to run at a maximum no-load speed of 31,000 rpm and having various stack lengths, and FIGS. 37 and 38 makes the same comparison, but for maximum no-load speeds of 32,000 rpm and 34,000 rpm.

Figure 1:
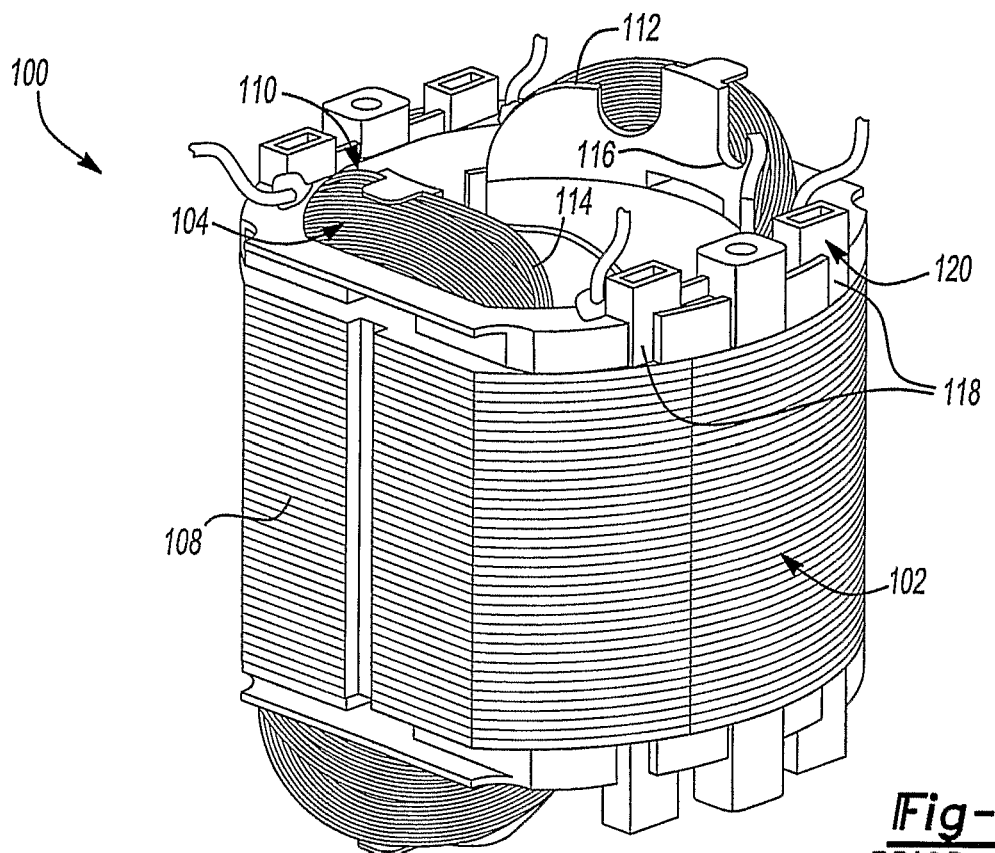
FIG. 1 is a perspective view of a prior art stator.
Figure 23:
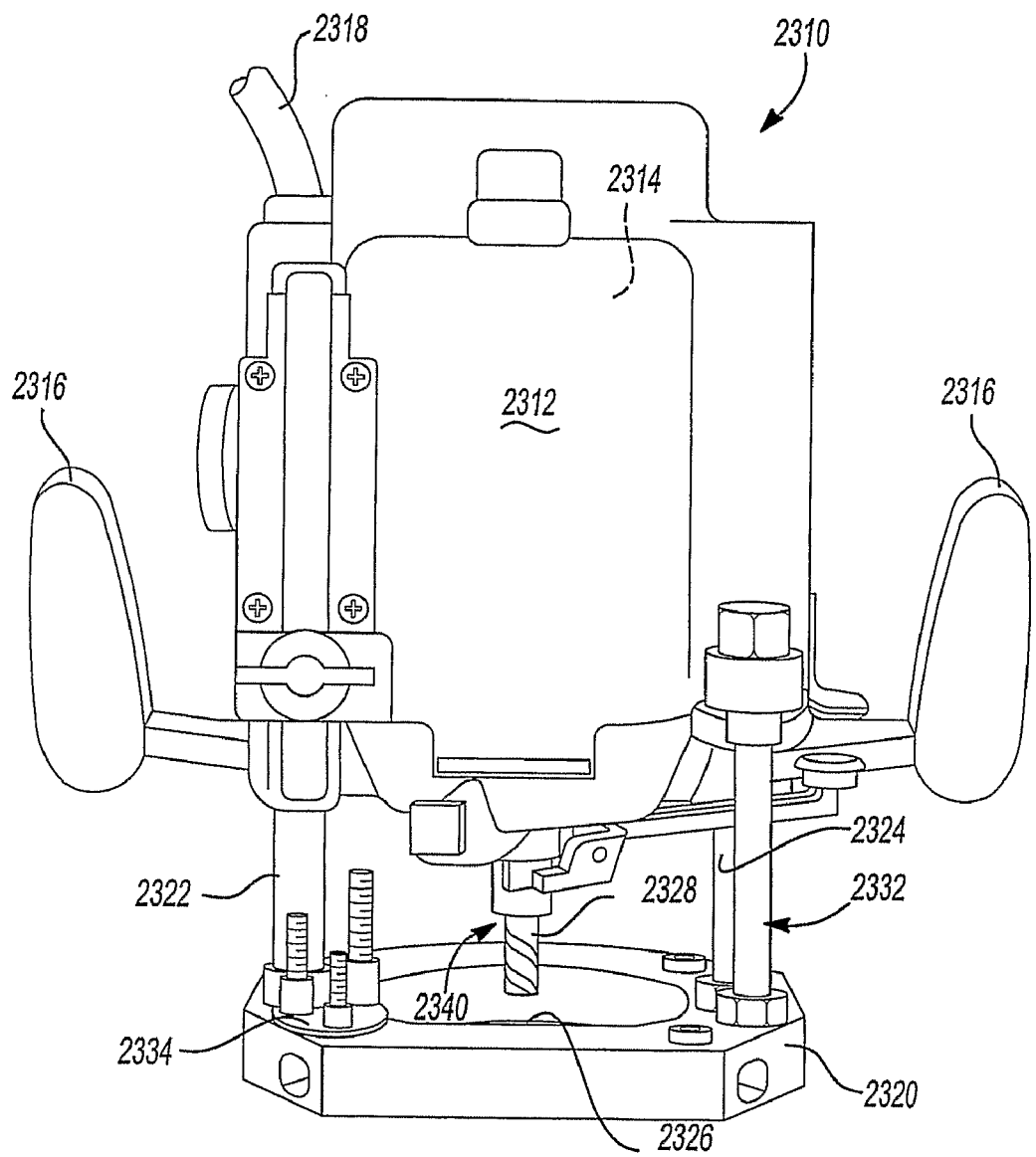
FIG. 23 is a perspective view of a hand-held router in accordance with an aspect of the invention.

Turning now to FIG. 23, a router 2310 in accordance with an aspect of the invention is described. Router 2310 has the basic characteristics of routers, such as the router described in U.S. Pat. No. 6,244,797 for a Router Keyless Chuck (the entire disclosure of which is incorporated by reference herein). While FIG. 23 (other than the reference numbers) is identical to FIG. 1 of U.S. Pat. No. 6,244,797, it should be understood that router 2310 is not identical to router 10 disclosed therein and has the differences in accordance with aspects of the invention as discussed below.

Router 2310 includes a housing 2312 which surrounds a motor 2314. Motor 2314 has a multi-piece stator of the type described above and an armature having an OD that is at least 0.625 the OD of the stator. It may also have field windings that extend beyond the tips of the pole pieces. The field windings may also be wound with larger gauge wire than a comparably sized prior art motor. A pair of handles 2316 extend from the router housing 2312. A power source, such as a power cord 2318, is coupled with the motor 2314. In this regard, motor 2314 may be a universal series motor. A base 2320 including a pair of supports 2322 and 2324 movably supports the motor housing 2312. The housing 2312 may move up and down along the supports 2322 and 2324. The base 2320 includes an aperture 2326 which enables a cutting tool or router bit 2328 to extend through the base aperture 2326 to cut a workpiece.

Also, a depth adjustment rod 2332 is mounted on the housing 2312. A rotary plate 2334 is mounted on the upper surface of the base 2320. The rotary plate 2334 has several depth stops, which are set to different heights, and which cooperate with the depth adjustment rod 2332 so that the operator can allow the housing 2312 to be lowered to a preselected depth. The router 2310 also includes a tool holder 2340. The tool holder 2340 is coupled to the motor 2314 either utilizing the motor spindle directly or utilizing a coupling mechanism to couple the tool holder with the motor 2314. The tool holder 2340 includes a spindle (not shown) which may be coupled directly or indirectly to the motor 2314 or be a part of the motor output. In this regard, as in conventional routers, motor 2314 is coupled directly to tool holder 2340 in the sense that there is no gearing between motor 2314 and tool holder 2340 that increase or decrease the speed so that cutting tool 2328 held in tool holder 2340 runs at the same speed as motor 2314.

Motor 2314 may illustratively be the same size as the prior art motor, such as motor 14 used in router 10 of U.S. Pat. No. 6,244,707, and wound to run at the same maximum no-load speed. In an embodiment, motor 2314 of router 2310 provides about eighteen percent (18%) more power than a prior art motor of the same size wound to run at the same maximum no-load speed. In a more specific embodiment, motor 2314 has a 73 mm OD frame size with a stack length of 50 mm wound to run at a maximum no-load speed of 28,000 rpm and provides at least 2,200 maximum watts or about 3¼ horsepower compared with the 2¼ horsepower that a comparably sized prior art motor wound to run at the same maximum no-load speed provides. Router 2310 having 3¼ horsepower is illustratively the same size as the prior art router having 2¼ horsepower. Router 2310 having increased power compared to the comparably sized prior art router can utilize larger router bits or make deeper cuts without bogging its motor down.

Figure 24:
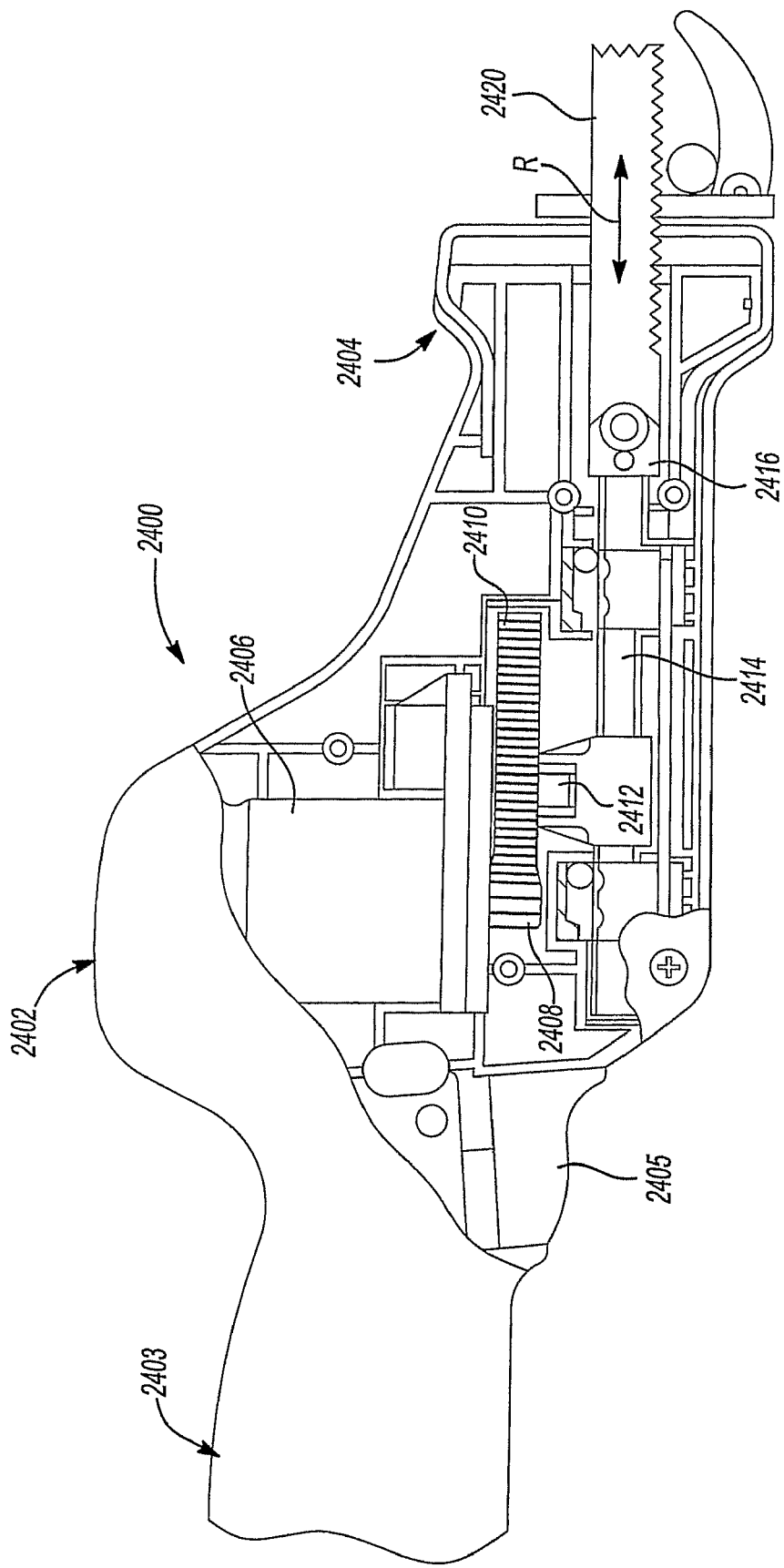
FIG. 24 is a perspective view, partially broken away, of a hand-held reciprocating saw in accordance with an aspect of the invention.

Turning now to FIG. 24, a reciprocating saw 2400 in accordance with an aspect of the invention is described. Reciprocating saw 2400 has the basic characteristics of prior art reciprocating saws, such as the reciprocating saw described in U.S. Pat. No. 6,449,851 for Powered Reciprocating Saw and Clamping Mechanism (the entire disclosure of which is incorporated by reference herein.) While FIG. 24 (other than the reference numbers) is identical to FIG. 1 of U.S. Pat. No. 6,449,851, it should be understood that reciprocating saw 2400 is not identical to the reciprocating saw disclosed therein and has the differences in accordance with aspects of the invention as discussed below.

Reciprocating saw 2400 has a housing 2402 having a handle portion 2403 and front portion 2404 from which a reciprocating saw blade 2420 projects through a slot in the front portion 2404, for reciprocation in the directions shown by the arrow R. An electric motor 2406 is mounted within the housing which drives a driving gear 2408. A switch 2405 is provided to turn the motor 2406 on and off. The driving gear 2408 is in engagement with gear wheel 2410. An eccentric pin 2412 is attached to the gear wheel 2410. The eccentric pin 2412 is in engagement with a transverse groove in which it can slide in a direction transverse to the direction of reciprocating movement of the saw blade 2420. The groove is formed in a member which is connected to a reciprocating shaft 2414. Rotation of the gear wheel 2410 thus drives the reciprocating shaft 2414 in a reciprocating movement. At the front end of the reciprocating shaft 2414 a blade holder 2416 is attached which holds the saw blade 2420.

Important ergonomic criteria for reciprocating saws are weight and size, particularly length. Lower weight enhances useability of the reciprocating saw, such as by reducing fatigue of the user. Shorter length makes the reciprocating saw easier to maneuver, particularly when the reciprocating saw is being used to cut materials in tight spaces, such as pipes in walls of buildings.

Motor 2406 of reciprocating saw 2400 is a motor of the type described above that has a multi-piece stator as described above and may also have field windings that extend beyond the tips of the pole pieces of the multi-piece stator. The field windings may also be wound with larger gauge wire than a comparably sized prior art motor. Motor 2406 may be a universal series motor. In an embodiment, motor 2406 having the same frame size as a prior art motor has comparable output power but has a smaller stack length. For example, a prior art motor having a 73 mm OD frame size, a 40 mm stack length and wound to run at a maximum no-load speed of 24,500 rpm has about 1,300 maximum watts out and a weight of about 1¼ kilogram. Motor 2406 also having a 73 mm OD frame size wound to run the maximum no-load speed of 24,500 and providing about 1300 maximum watts out has a stack length of 35 mm and weighs about five percent less than the prior art motor. The length of reciprocating saw 2400 is illustratively shortened 5 mm.

In another alternative of reciprocating saw 2400, motor 2406 having the same frame size, stack length and wound to run at the same maximum no-load speed as a prior art motor provides increased power compared to the prior art motor. For example, motor 2406 having a 73 mm OD frame size, a stack length of 40 mm, and wound to run at a maximum no-load speed of 24,500 rpm provides about 1500 maximum watts out. By providing more power to drive the saw blade, the blade is less likely to bog down as it is cutting.

Figure 25:
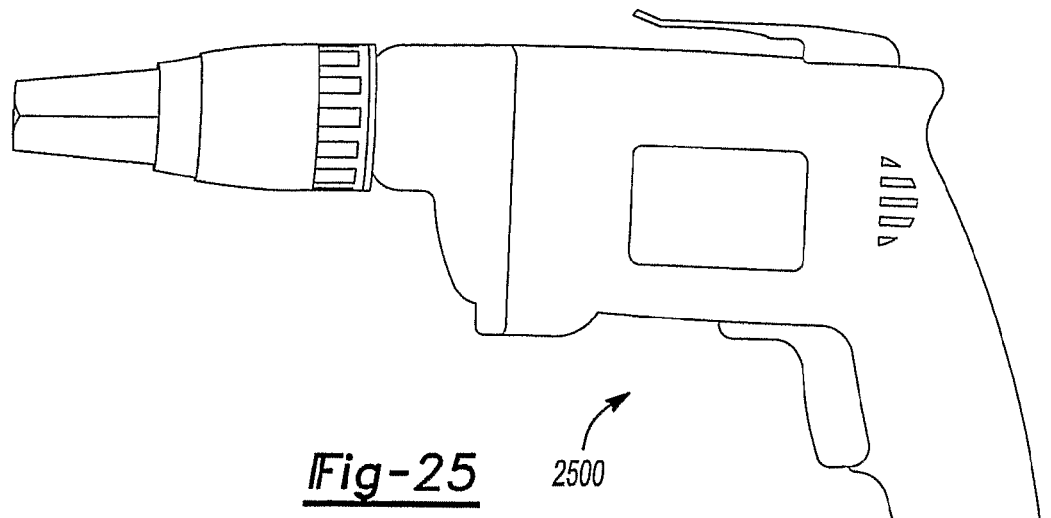
FIG. 25 is a perspective view of a hand-held power screw gun in accordance with an aspect of the invention.

Turning now to FIG. 25, a hand-held power screw driver or screw gun 2500 in accordance with an aspect of the invention is described. Hand held-power screw guns have many of the same basic components as a hand-held power drill, such as illustrated in FIG. 8. The principal difference is that hand-held screw guns have mechanical clutches coupling the tool holder to the output of the drivetrain. FIG. 25 is identical to an illustration of a DEWALT® DW252 power screw driver. It should be understood, however, that screw gun 2500 is not identical to the DW252 screw driver and differs in that it uses a motor such as motor 813 described above with reference to the hand-held power drill illustrated in FIG. 8.

Figure 26:
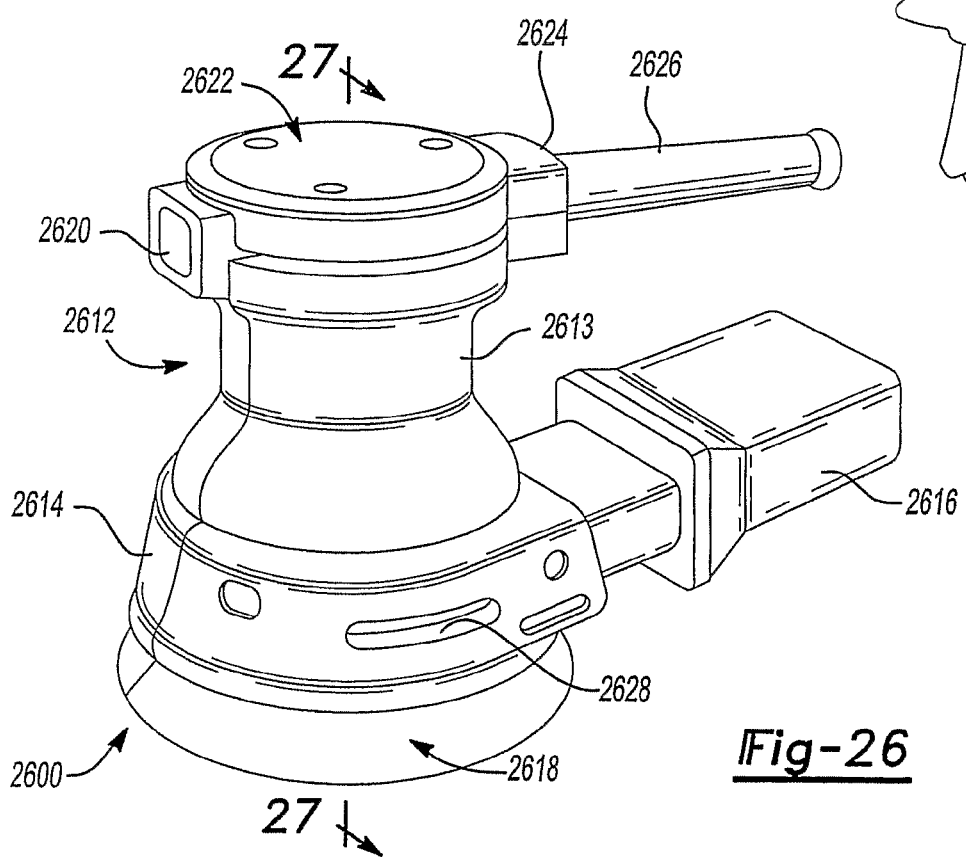
FIG. 26 is a perspective view of a hand-held random orbital sander in accordance with an aspect of the invention.
Figure 27:
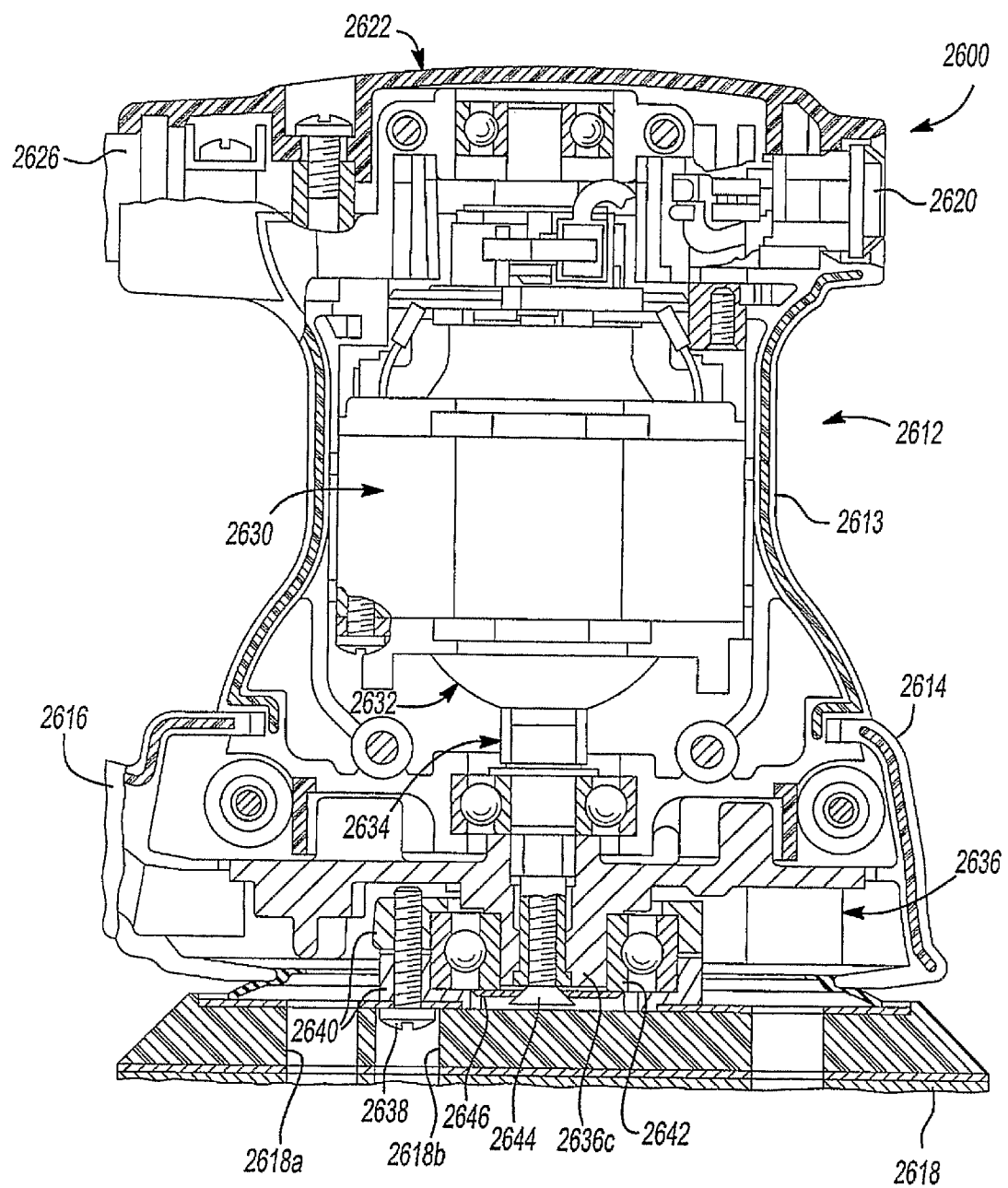
FIG. 27 is a side section view of the hand-held random orbital sander of FIG. 26 taken along line 27-27 of FIG. 26.

Turning now to FIGS. 26 and 27, a random orbital sander 2600 in accordance with an aspect of the invention is described. Random orbital sander 2600 has the basic characteristics of prior art random orbital sanders, such as the random orbital sander described in U.S. Pat. No. 5,392,568 for Random Orbit Sander Having Braking Member (the entire disclosure of which is incorporated by reference herein. While FIGS. 26 and 27 (other than the reference numbers) are identical to FIGS. 1 and 2 of U.S. Pat. No. 5,392,568, it should be understood that random orbital sander 2600 is not identical to the random orbital sander disclosed therein and has the differenced in accordance with aspects of the invention as discussed below. Also, it should be understood that the aspects of the invention described with respect to random orbital sander 2600 are also applicable to orbital sanders.

Random orbital sander 2600 generally includes a housing 2612 which includes a two-piece upper housing section 2613 and a two-piece shroud 2614 at a lower end thereof. Removably secured to the shroud 2614 is a dust canister 2616 for collecting dust and other particulate matter generated by the sander during use. A platen 2618 having a piece of sandpaper (not shown) releasably adhered thereto is disposed beneath the shroud 2614. The platen 2618 is adapted to be driven rotationally and in a random orbital pattern by a motor 2630 (FIG. 27) disposed within the upper housing section 2613. The shroud section 2614 further includes a plurality of openings 2628 (only one of which is visible in FIG. 26) for allowing a cooling fan 2636 (FIG. 27) driven by the motor 2630 within random orbital sander 2600 to expel air drawn into and along the interior area of the housing 2612 to help cool motor 2630.

With reference now to FIG. 27, the motor 2630 includes an armature 2632 having an output shaft 2634 associated therewith. The output shaft or drive spindle 2634 is coupled to a combined motor cooling and dust collection fan 2636. The platen 2618 is secured to a bearing retainer 2640 via a plurality of threaded screws 2638 (only one of which is visible in FIG. 27) which extend through openings 2618b in the platen 2618. The bearing retainer 2640 carries a bearing 2642 that is journalled to an eccentric arbor 2636c formed on the bottom of the fan 2636. The bearing assembly is secured to the arbor 2636c via a threaded screw 2644 and a washer 2646. It will be noted that the bearing 2642 is disposed eccentrically to the output shaft 2634 of the motor 2630, which thus imparts an orbital motion to the platen 2618 as the platen 2618 is driven rotationally by the motor 2630.

Important ergonomic criteria for orbital and random orbital sanders are overall height and reasonable girth.

Motor 2630 of random orbital sander 2600 is a motor of the type described above that has a multi-piece stator as described above and may also have field windings that extend beyond tips of the pole pieces of the multi-piece stator. The field windings may also be wound with larger gauge wire than a comparably sized prior art motor. Motor 2630 is illustratively a universal series motor. In an embodiment, motor 2630 has comparable output power to that of a prior art motor but has a smaller frame size and may also have a smaller stack length. For example, motor 2630 of random orbital sander 2600 wound to run at a maximum no-load speed of 12,250 rpm having a 55 mm OD frame size with a 25 mm stack length is rated for input amperage of three amps compared to a prior art motor rated at the same input amperage of three amps but which has a 57 mm OD frame size and a 35 mm stack length and is also wound to run at a maximum no-load speed of 12,250 rpm. Random orbital sander 2600 may thus be 10 mm shorter than the prior art random orbital sander having a height of about 130 mm compared to 140 mm.

In hand-held power tools that are grinders, important ergonomic criteria include motor power and weight and the girth of the tool where it is held by the user, weight and tool length. In small grinders, such as small angle grinders, motor power and girth tend to be the more important ergonomic criteria.

Figure 28:
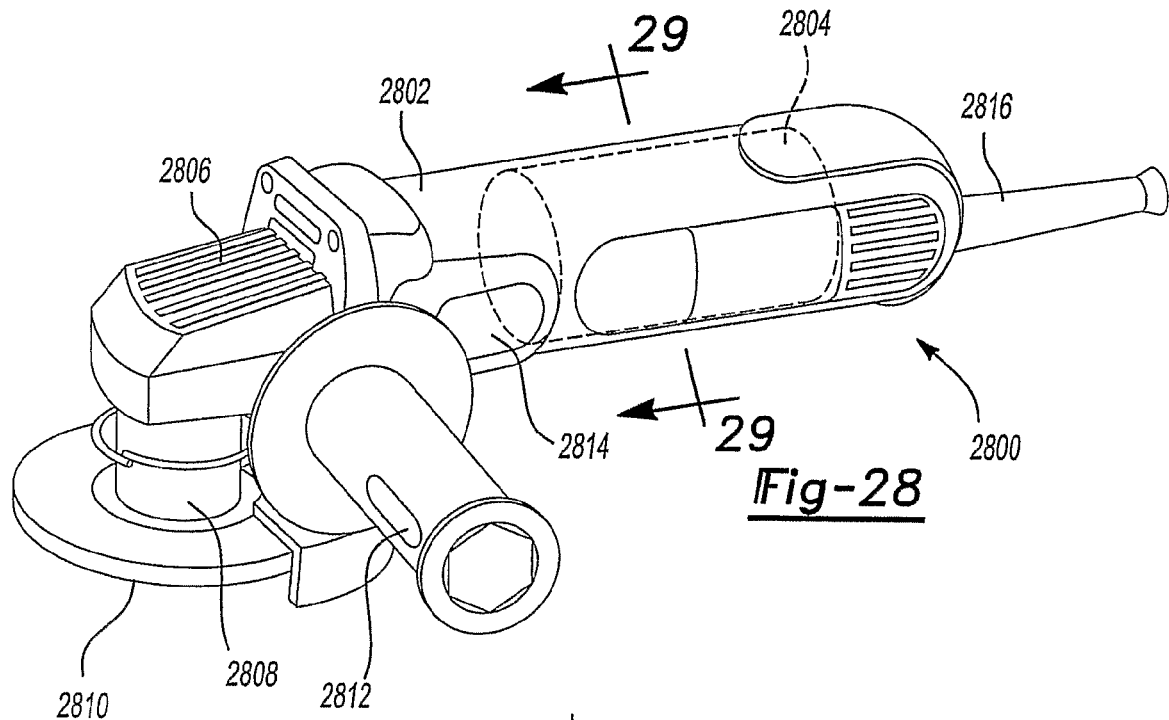
FIG. 28 is a perspective view of a grinder in accordance with an aspect of the invention.

Turning to FIG. 28, a grinder 2800 in accordance with an aspect of the invention. Grinder 2800 is illustratively shown as a small angle grinder. It should be understood, however, that grinder 2800 can be other types of grinders, such as medium angle grinders, large angle grinders, and die grinders.

Grinder 2800 has the same basic characteristics as prior art grinders, such as a DEWALT® DW818 small angle grinder. In this regard, FIG. 28 is closely identical to an illustration of the DW818 small angle grinder, but it should be understood that grinder 2800 is not identical to the DW818 grinder and has the differences described below. The illustration of the DW818 grinder is used for convenience as it shows the basic components of a grinder and is not to be construed as a concession that grinder 2800 is in the prior art.

Grinder 2800 includes a housing 2802 surrounding a motor 2804 that is coupled to a gear case assembly 2806. Gear case assembly is also attached to one end of housing 2802. Gear case assembly 2806 is coupled to a spindle assembly 2808 to which a grinding wheel or disc 2810 is attached. A handle 2812 is attached to one side of gear case assembly 2806. Motor 2804 is electrically coupled through switch 2814 to a source of power by power cord 2816. In use, a user grasps the housing 2802 and applies the grinding wheel 2810 to a workpiece (not shown).

Grinder 2800 deviates from the prior art grinders, such as the DW818, in that motor 2804, which may be a universal series motor, has a multi-piece stator of the type described above, and may also have field windings extending beyond the tips of the pole pieces of the stator. The field windings may also be wound with larger gauge wire than a comparably sized prior art motor. Grinder 2800 deviates from the prior art grinders in other respects as described in more detail below.

Grinder 2800 has a girth (circumference) of 200 mm or less and a maximum watts out of at least 1000 watts. That is, grinder 2800 has a maximum power out to girth ratio of at least 5 watts to 1 mm. It should be understood that this is also advantageous in other power tools in which girth and power are important ergonomic criteria, such as power tools where the user grasps the housing that surrounds a motor when using the tool. Such power tools include, by way of example and not of limitation, grinders, nibblers, polishers, shears, sanders, trim routers and right angle drill/drivers.

Figure 29:
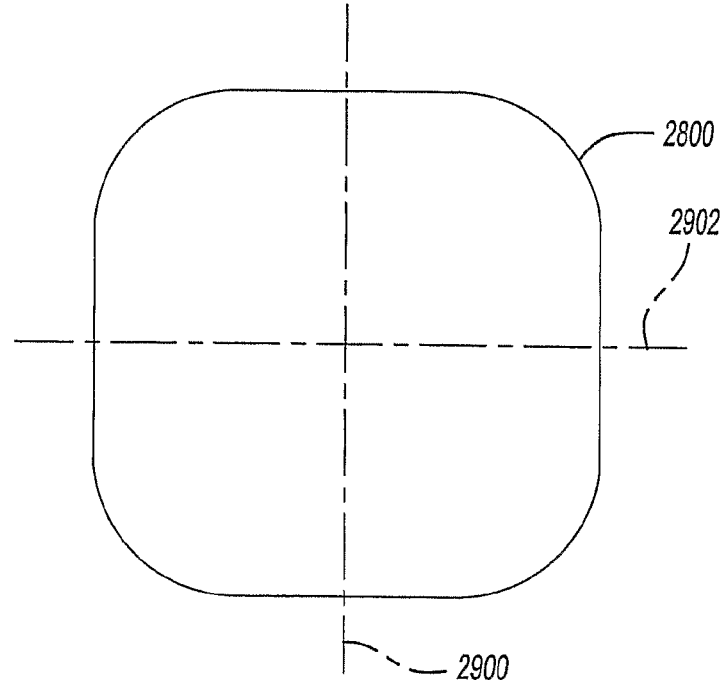
FIG. 29 is cross-section view of the grinder of FIG. 28 taken along the line 29-29 of FIG. 28.

With reference to FIG. 29, in an embodiment, grinder 2800 illustratively has an oblong cross-section having a major axis 2900 and a minor axis 2902. Grinder 2800 illustratively has a girth of 194 mm with a height of 62 mm (taken along major axis 2900) and a width of 52 mm (taken along minor axis 2902). Motor 2804 of grinder 2800 illustratively has a 55 mm OD frame size, a 48 mm stack, and wound to run at a maximum no-load speed of 38,000 rpm provides about 1200 maximum watts out. A prior art grinder of comparable size having a prior art motor with a 55 mm OD frame size and a 48 mm stack wound to run at a maximum no-load speed of 38,000 rpm provides about 650 to 700 maximum watts out. A prior art grinder having a prior art motor wound to run at no-load speed of 38,000 rpm and providing at least 1000 maximum watts out would require a 49 mm stack in a 59 mm OD frame size motor.

Grinder 2800 having comparable power to a prior art grinder may illustratively have a motor 2804 having the same frame size as the motor in the prior art grinder but with a shorter stack. For example, a prior art large angle grinder having a 95 mm OD frame size motor with a 45 mm stack length and wound to run at a no-load speed of about 23,500 rpm provides about 2,900 maximum watts out. Grinder 2800 as a large angle grinder with motor 2804 having a 95 mm OD frame size may illustratively have a 35 mm stack length and wound to run at a no-load speed of about 23,500 rpm provides about 3,000 maximum watts out. Grinder 2800 having motor 2804 with the shorter stack compared to the motor in the prior art grinder may also be shorter than the prior art grinder by the same amount that the stack of motor 2804 is shorter than the stack in the prior art grinder. In another embodiment, grinder 2800 as a large angle grinder has motor 2804 having a 95 mm OD frame size and a 48 mm stack length and wound to run at a maximum no-load speed of 23,500 rpm provides about 3,700 maximum watts out. A prior art motor in a prior art large angle grinder providing comparable power is wound to run at the same maximum no-load speed of 23,500 rpm and has a 95 mm OD frame size and a 60 mm stack length.

The higher power of motor 2804 compared to comparably sized prior art motors provides a stiffer torque-speed curve. This enables the user of a power tool such as grinder 2800 to apply more force to the work piece when grinding without bogging grinder 2800 down, or to grind more material in a given amount of time.

Figure 30:
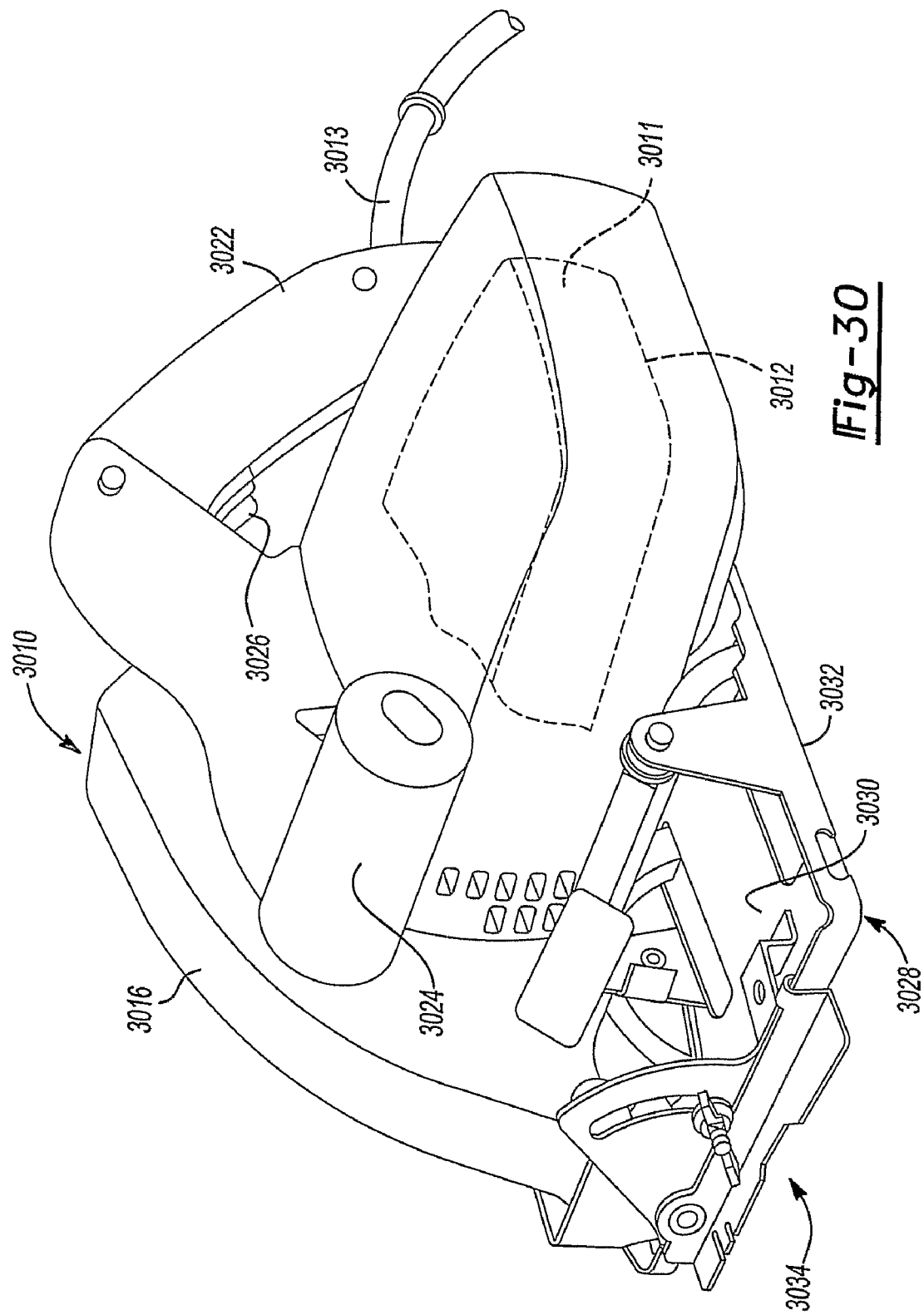
FIG. 30 is a perspective view of a circular saw in accordance with an aspect of the invention.

Turning now to FIG. 30, a circular saw 3010 in accordance with an aspect of the invention is described. Circular saw 3010 has the basic characteristics of circular saws, such as the circular saw described in U.S. Pat. No. 5,561,907 for Aligning Mechanism for Hand-Held Power Saw (the entire disclosure of which is incorporated by reference herein). While FIG. 30 (other than the reference numbers) is identical to FIG. 1 of U.S. Pat. No. 5,561,907, it should be understood that circular saw 3010 is not identical to circular saw 10 disclosed therein and has the differences in accordance with aspects of the invention as discussed below.

Important ergonomic criteria for circular saws are size, weight and balance.

Circular saw 3010 has a motor assembly 3012 having a motor 3011 to which is operably attached a rotating circular saw blade 3014. Motor 3011 has a multi-piece stator of the type described above and an armature having an OD that is at least 0.625 the OD of the stator. It may also have field windings that extend beyond the tips of the pole pieces. The field windings may also be wound with larger gauge wire than a comparably sized prior art motor. A power cord 3013 supplies electrical power to motor 3011, which is illustratively a universal series motor. Blade 3014 is generally surrounded by an upper stationary guard 3016 and a lower movable guard (not shown). Guard 3016 is fixably secured to motor assembly 3012. The lower guard exposes the lower portion of blade 3014 in a manner that is well-known in the art.

Circular saw 3010 further includes a rear trigger handle 3022 and a forward brace handle 3024. Trigger handle 3022 has a switch 3026 mounted thereon for operation by one hand of a user. The other hand of the user is positioned on brace handle 3024 which allows the user to control the circular saw as blade 2014 passes through a workpiece.

A generally planar base or shoe 3028 is attached to stationary guard 3016. Base 3028 has an upper planar surface 3030 and a lower planar surface 3032. Lower surface 3032 rests on the upper surface of the workpiece as the saw passes therethrough and is used to gauge the depth to which blade 3014 cuts. Blade 3014 and the movable guard are positioned through an elongated opening (not shown) formed in base 3028 so that blade 3014 and the movable guard can be positioned below lower surface 3032 to engage a workpiece. Base 3028 is usually adjustable so that the portion of blade 3014 extending below lower surface 3032 can be varied to adjust the cutting depth of the blade. Further, base 3028 has angle-adjusting mechanism 3034 which allows the angle of blade 3014 to be adjusted from a perpendicular position to various angular positions with respect to the planar surface of base 3028.

In an illustrative embodiment, motor 3011 of circular saw 3010 has a 95 mm OD frame size with a 30 mm stack length and wound to run at a maximum no-load speed of about 24,500 rpm provides about 2,125 maximum watts out. In contrast, a prior art circular saw having a motor providing comparable power with the same frame size has a 35 mm stack length. In an embodiment, circular saw 3010 having motor 3011 with the shorter stack length has motor 3011 moved closer to a centerline of circular saw 3010, improving the balance of circular saw 3010.

Figure 31:
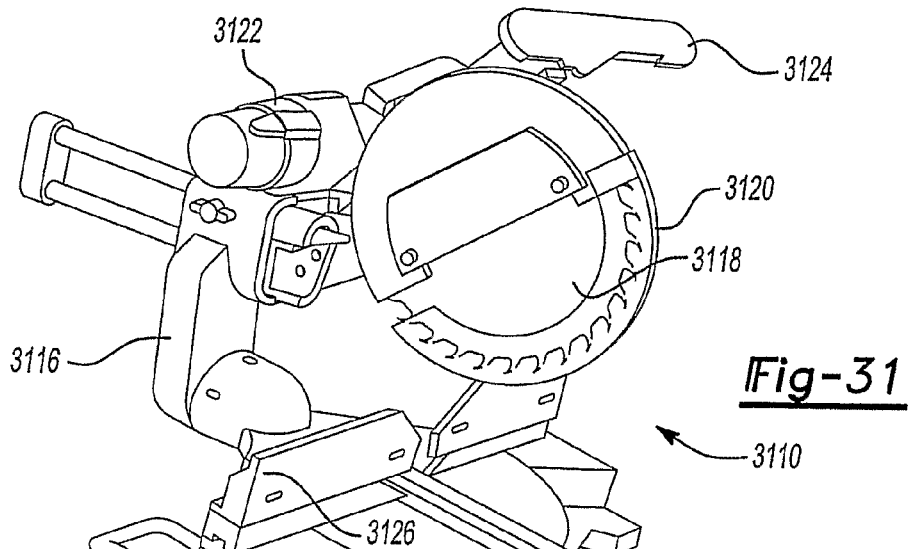
FIG. 31 is a perspective view of a miter saw in accordance with an aspect of the invention.

Turning now to FIG. 31, a miter saw 3110 in accordance with an aspect of the invention is described. Miter saw 3110 has the basic characteristics of miter saws, such as the miter saw described in U.S. Pat. No. 6,823,765 for Bevel Locking System for a Sliding Compound Miter Saw (the entire disclosure of which is incorporated by reference herein). While FIG. 31 (other than the reference numbers) is identical to FIG. 1 of U.S. Pat. No. 6,823,765, it should be understood that miter saw 3110 is not identical to miter saw 10 disclosed therein and has the differences in accordance with aspects of the invention as discussed below.

Important ergonomic criteria for miter saws are power, size and weight.

Miter saw 3110 comprises a base assembly 3112, a table assembly 3114, a housing assembly 3116, a saw blade 3118, a blade guard 3120, a motor 3122 drivingly connected to saw blade 3118, a handle 3124 and a fence assembly 3126. Motor 3122 has a multi-piece stator of the type described above and an armature having an OD that is at least 0.625 the OD of the stator. It may also have field windings that extend beyond the tips of the pole pieces. The field windings may also be wound with larger gauge wire than a comparably sized prior art motor. Table assembly 3114 is secured to base assembly 3112 such that it can be rotated in order to provide adjustment for miter cutting. The rotation of table assembly 3114 changes the angle of saw blade 3118 relative to fence assembly 3126 but maintains the perpendicularity of saw blade 3118 with table assembly 3114. A locking mechanism 3128 can be activated in order to lock table assembly 3114 to base assembly 3112.

Housing assembly 3116 is secured to table assembly 3114 such that it can be pivoted with respect to table assembly 3114 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 3118 relative to table assembly 1314 but maintains the perpendicularity of saw blade 18 with respect fence assembly 3126. A locking mechanism (not shown) can be activated in order to lock housing assembly 3116 to table assembly 3114 at any desired bevel angle.

In an illustrative embodiment, motor 3122 of miter saw 3110 has a 95 mm OD frame size with a 35 mm stack length and wound to run at a maximum no-load speed of about 25,000 rpm provides about 2,350 maximum watts out. In contrast, a prior art miter saw having a motor providing comparable power with the same frame size and wound to run at a maximum no-load speed of 24,500 rpm has a 40 mm stack.

Figure 32:
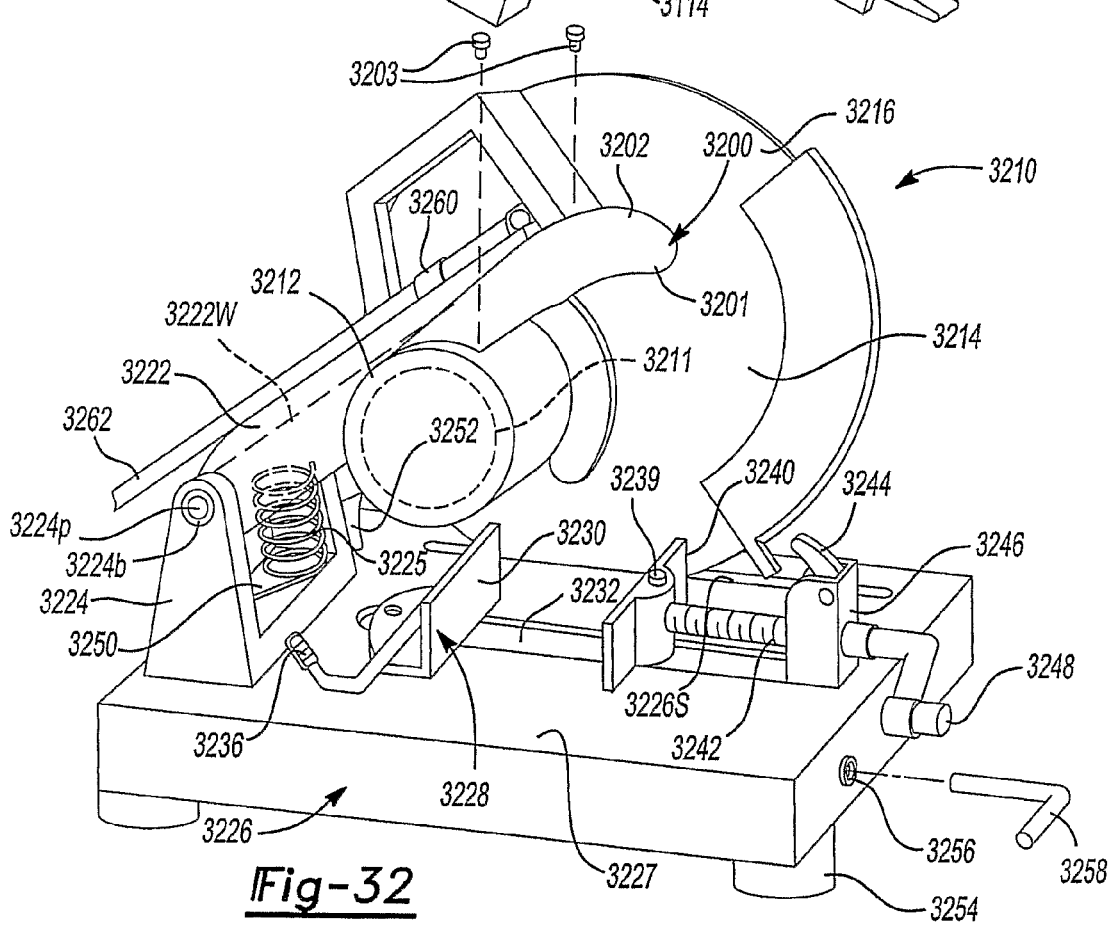
FIG. 32 is a perspective view of a chop saw in accordance with an aspect of the invention.

Turning now to FIG. 32, a chop saw 3210 in accordance with an aspect of the invention is described. Chop saw 3210 has the basic characteristics of chop saws, such as the chop described in U.S. Pat. No. 6,609,442 for Chop Saw (the entire disclosure of which is incorporated by reference herein). While FIG. 32 (other than the reference numbers) is identical to FIG. 1 of U.S. Pat. No. 6,609,442, it should be understood that chop saw 3210 is not identical to chop saw 10 disclosed therein and has the differences in accordance with aspects of the invention as discussed below.

Important ergonomic criteria of chop saws are power, size and weight.

Chop saw 3210 includes a motor field case 3212 containing a motor 3211 which drives a blade 3214. Motor 3211 has a multi-piece stator of the type described above and an armature having an OD that is at least 0.625 the OD of the stator. It may also have field windings that extend beyond the tips of the pole pieces. The field windings may also be wound with larger gauge wire than a comparably sized prior art motor. A power cord 3262 couples motor 3211 to a source of power (not show), such as AC, and power cord 3262 may be held in place by tabs 3260. A stationary guard 3216 covers a portion of the blade 3214. A movable guard 3218 may telescope over the stationary guard 3216, or preferably pivot about a point to expose blade 3214 during a cutting operation.

A handle 3200 is preferably mounted on motor field case 3212 and/or an arm 3222. Preferably handle 3200 includes a lower portion 3201 mounted on motor field case 3212 (and/or arm 3222), and an upper portion 3202 fixedly attached to lower portion 3201. Screws 3203 may be used to attach upper portion 3202 to lower portion 3201.

Arm 3222 preferably also carries blade 3214, and guards 3216, 3218. Arm 3222 is pivotally mounted on an arm support 3224, which is mounted on base 3226. Preferably, a pivot rod 3224P is disposed between the arm support 3224. Arm 3222 is preferably pivotably disposed on pivot rod 3224P, allowing the chopping action. Preferably, the arm 3222 and/or arm support 3224 may have at least one bearing 3224B disposed about and/or supporting the pivot rod 3224P for facilitating rotation thereabout. Accordingly, arm 3222 may be moved between two positions: an upper position, where the blade 3214 does not engage the workpiece (not shown), and a lower position, where the blade 3214 engages and cuts the workpiece. Preferably, blade 3214 may be plunged through a slot 3226S on base 3226.

Arm support 3224 preferably has a forwardly-extending portion 3250. Preferably portion 3250 is fixedly attached to arm support 3224, so that portion 3250 does not move. A spring 3225 is supported between portion 3250 and an inner wall 3222W of arm 3222. Because the spring 3225 is preferably an expansion spring (also known as a compression spring), arm 3222 is normally biased towards the upward position by spring 3225.

A chip deflector 3252 may be mounted on base 3226 and/or to arm support 3224. Chip deflector 3252 assists in directing the flow of chips resulting from the cutting operation.

Base 3226 has a workpiece support (or work surface) 3227. Fence subassembly 3228 is preferably disposed on workpiece support 3227. Preferably, an operator may slide and rotate fence subassembly 3228 along workpiece support 3227.

Fence subassembly 3228 includes a workpiece-engaging portion 3230 which is guided along the base 3226 via a slot formed in the work surface 3227 (through-slot 3232), as well as actuator 3236, which the operator may rotate to lock or unlock the fence subassembly 3228 as desired.

A vise jaw 3240 co-acts with fence subassembly 3228 to clamp a workpiece. The vise jaw 3240 may rotate, so that a workpiece can be clamped in a desired angular orientation relative to blade 3214. Preferably the fence subassembly 3228 and vise jaw 3240 can be rotated along their respective "Y" axes to achieve a desired angle such as, for example, 30.degree. or 45.degree., so that the chop saw can make a miter cut. The vise jaw 3240 may be advanced to a clamping position by rotation of vise screw 3242. Preferably the axis of vise screw 3242 is substantially parallel to the work surface 3227. The vise jaw 3240 preferably pivots about jaw bolt or pin 3239, which is sized to slideably advance or retract along through-slot 3232.

A vise latch 3244 may be mounted in a conventional way on a latch support 3246 to latch the vise screw 3242 in its clamping position. The clamping force can be augmented by rotation of vise handle 3248, which is fixedly connected to vise screw 3242. Persons skilled in the art will recognize that the vise latch 44 may be disengaged to allow movement of the vise screw 3242 towards fence subassembly 3228, then engaged to latch the vise screw 3242 in its clamping position. Base 3226 may also have molded rubber feet 3254 disposed thereon. Further, base 3226 may have a rubber grommet 3256, which receives a wrench 3258.

In an illustrative embodiment, motor 3211 of chop saw 3210 has a 95 mm OD frame size with a 48 mm stack length and wound to run at a maximum no-load speed of about 25,000 rpm provides about 3,200 maximum watts out. In contrast, a prior art chop saw having a motor providing comparable power with the same frame size has a 60 mm stack length.

Figure 33:
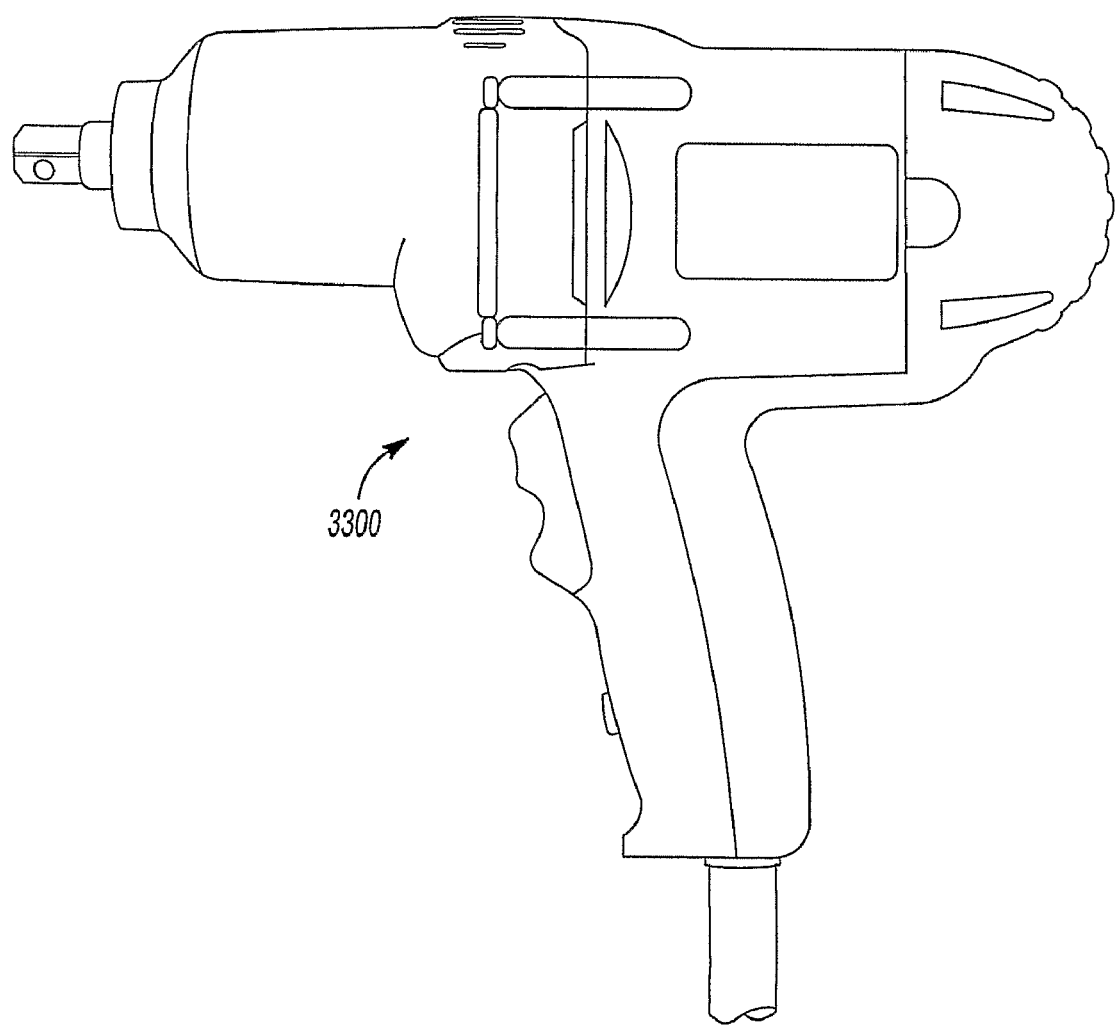
FIG. 33 is a perspective view of an impact wrench in accordance with an aspect of the invention.

Other types of power tools in which a motor having a multi-piece stator of the type described above can advantageously be used include hand-held power impact wrenches, such as impact wrench 3300 (FIG. 33). Impact wrench 3300 has the same basic characteristics as prior art impact wrenches, such as a DEWALT® DW292 impact wrench. In this regard, FIG. 33 is closely identical to an illustration of the DW292 impact wrench, but it should be understood that impact wrench 3300 is not identical to the DW292 impact wrench. The illustration of the DW202 grinder is used for convenience as it shows the basic components of an impact wrench and is not to be construed as a concession that impact wrench 3300 is in the prior art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hand-held power tool, comprising:
    a housing in which an electric motor is disposed;
    the electric motor having a stator, the stator having separate pole pieces and return path pieces joined together and field coils disposed around necks of the pole pieces, the electric motor also having an armature disposed in the stator, the armature having an outside diameter that is at least 0.625 an outside diameter of the stator; and
    the housing having a girth of 200 mm or less with the motor wound to provide a maximum watts out to housing girth ratio of at least 5 maximum watts outs to 1 mm of housing girth.

2. The apparatus of claim 1 wherein the power tool is a small angle grinder.

3. The apparatus of claim 1 wherein the stator has an OD no greater than 55 mm and a lamination stack having a length no greater than 48 mm, and the motor with a maximum no-load speed of 38,000 rpm provides at least 1000 maximum watts out.

4. The apparatus of claim 3 wherein the motor with a maximum no-load speed of 38,000 rpm provides at least 1200 maximum watts out.

5. The apparatus of claim 3 wherein the power tool is a small angle grinder.

6. The apparatus of claim 1 wherein the housing has height taken along a major axis of the housing of no more than 62 mm and a width taken along a minor axis of the housing of no more than 55 mm.

7. The apparatus of claim 6 wherein the power tool is a small angle grinder.

8. The apparatus of claim 1 wherein the field coils extend beyond pole tips of the pole pieces.

* * * * *

UNITED STATES PATENT AND TRADEMARK OFFICE
CERTIFICATE OF CORRECTION

| | | |
|---|---|---|
| PATENT NO. | : 7,893,583 B2 | Page 1 of 1 |
| APPLICATION NO. | : 11/885712 | |
| DATED | : February 22, 2011 | |
| INVENTOR(S) | : Hung T. Du et al. | |

It is certified that error appears in the above-identified patent and that said Letters Patent is hereby corrected as shown below:

Title Page, Related U.S. Application Data, insert the following:

-- (63) Continuation-in-part of application No. 10/934,334, filed on Sep. 3, 2004; and continuation-in-part of application No. 10/934,104, filed Sep. 4, 2004; and continuation-in-part of application No. 10/934,333, filed Sep. 3, 2004, all of which claim the benefit of Provisional Application Nos. 60/500384 filed Sep. 5, 2003 and 60/546243 filed Feb. 20, 2004. --.

Signed and Sealed this
Seventeenth Day of May, 2011

David J. Kappos
*Director of the United States Patent and Trademark Office*